(12) United States Patent
Williams

(10) Patent No.: US 8,831,886 B2
(45) Date of Patent: Sep. 9, 2014

(54) SYSTEM AND METHOD FOR RECONSTRUCTING MICROSEISMIC EVENT STATISTICS FROM DETECTION LIMITED DATA

(75) Inventor: Michael John Williams, Ely (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 451 days.

(21) Appl. No.: 12/977,150

(22) Filed: Dec. 23, 2010

(65) Prior Publication Data

US 2012/0160481 A1 Jun. 28, 2012

(51) Int. Cl.
| | | |
|---|---|---|
| *G01V 1/34* | (2006.01) | |
| *G01V 1/30* | (2006.01) | |
| *G01H 17/00* | (2006.01) | |
| *G06F 17/40* | (2006.01) | |
| *G06F 19/00* | (2011.01) | |

(52) U.S. Cl.
CPC ... *G01V 1/34* (2013.01); *G01V 1/30* (2013.01); *G01H 17/00* (2013.01); *G06F 17/40* (2013.01); *G06F 19/00* (2013.01)
USPC ...... 702/16; 73/152.46; 166/250.01; 166/250.16; 175/50; 181/102; 367/28; 367/30; 367/38; 367/69; 702/187; 702/189; 705/7.13

(58) Field of Classification Search
CPC ....... E21B 47/00; E21B 47/10; E21B 47/101; E21B 49/00; E21B 2049/00; G01D 21/00; G01H 17/00; G01V 1/00; G01V 1/003; G01V 1/28; G01V 1/30; G01V 1/301; G01V 1/34; G01V 1/40; G01V 1/44; G01V 1/48; G01V 1/50; G01V 2010/00; G01V 2210/60; G01V 2210/64; G01V 2210/646; G01V 2210/70; G01V 2210/74; G06F 11/00; G06F 11/30; G06F 11/32; G06F 17/00; G06F 17/40; G06F 19/00; G06Q 10/00; G06Q 10/06; G06Q 10/63

USPC ................ 73/19.01, 152.01, 152.02, 152.43, 73/152.46, 152.47, 570, 584, 296, 603, 73/865.8, 866.3; 166/244.1, 249, 250.01, 166/250.1, 250.16, 254.1; 175/40, 50; 181/101, 102; 324/323; 367/14, 25, 28, 367/30, 37, 38, 47, 68, 69; 702/1, 2, 6, 11, 702/14, 16, 127, 187, 189; 705/1.1, 7.11, 705/7.12, 7.13; 708/100, 105, 200
IPC ..................... E21B 47/00,47/10, 47/101, 49/00, E21B 2049/00; G01D 21/00; G01H 17/00; G01V 1/00, 1/003, 1/28, 1/30, 1/301, 1/34, G01V 1/40, 1/44, 1/48, 1/50, 2210/00, 2210/60, G01V 2210/64, 2210/646, 2210/70, 2210/74; G06F 11/00, 11/30, 11/32, 17/00, 17/40, G06F 19/00; G06Q 10/00, 10/06, 10/063

See application file for complete search history.

(56) References Cited

U.S. PATENT DOCUMENTS

| | | | | |
|---|---|---|---|---|
| 3,356,177 | A * | 12/1967 | Loren | 367/30 |
| 3,369,626 | A * | 2/1968 | Zemanek, Jr. | 367/69 |
| 4,066,992 | A * | 1/1978 | Buller et al. | 367/36 |
| 5,018,112 | A * | 5/1991 | Pinkerton et al. | 367/72 |
| 5,996,726 | A | 12/1999 | Sorrells et al. | |
| 6,272,434 | B1 * | 8/2001 | Wisler et al. | 702/9 |
| 7,058,513 | B2 * | 6/2006 | Gilmer et al. | 702/14 |
| 7,301,852 | B2 * | 11/2007 | Leggett et al. | 367/32 |
| 7,652,951 | B2 * | 1/2010 | Leggett et al. | 367/32 |
| 2005/0036403 | A1 * | 2/2005 | Leggett et al. | 367/32 |
| 2005/0038606 | A1 * | 2/2005 | Gilmer et al. | 702/14 |
| 2008/0130409 | A1 * | 6/2008 | Leggett, III et al. | 367/35 |
| 2009/0010104 | A1 | 1/2009 | Leaney | |
| 2013/0144532 | A1 | 6/2013 | Williams et al. | |

FOREIGN PATENT DOCUMENTS

GB 2409723 A * 7/2005

OTHER PUBLICATIONS

Albright, J. N., and Pearson, C. F., "Acoustic Emissions as a Tool for Hydraulic Fracture Location: Experience at the Fenton Hill Hot Dry Rock Site", Society of Petroleum Engineers, Aug. 1982, vol. 22(4): pp. 523-530.

Urbancic, T. I., Shumila, V., Rutledge, J. T., and Zinno, R. J., "Determining Hydraulic Fracture Behaviour Using Microseismicity", The 37th U.S. Symposium on Rock Mechanics, Jun. 1999: 8 pages.

Urbancic, T. I. and Rutledge, J., "Using Microseismicity to Map Cotton Valley Hydraulic Fractures", Society of Petroleum Engineers Annual Meeting, Aug. 2000: 5 pages.

International Search Report and Written Opinion of corresponding PCT Application No. PCT/IB2011/055835 dated Apr. 18, 2012: pp. 1-3.

A Method of Allowing for Known Observational Selection in Small Samples Applied to 3CR Quasars, D. Lynden-Bell, Mon. Not. R. Astr. Soc., v155, pp. 95-118, 1971.

SPE 77440—Microseismic Imaging of Hydraulic Fracture Complexity in the Barnett Shale, S.C. Maxwell, T.I. Urbancic, N. Steinsberger, and R. Zinno, Sep. 29-Oct. 2, 2002.

SPE 102801—Imaging Seismic Deformation Induced by Hydraulic Fracture Complexity, S. C. Maxwell, C. K. Waltman, N.R. Warpinski, M. J. Mayerhoefer and N. Boroumond, 2006 SPE Annual Technical Conference and Exhibition, San Antonio, TX, USA, Sep. 24-27, 2006. Revised manuscript received Sep. 12, 2008. Copyright 2009 Society of Petroleum Engineers.

SPE 115771—Hydraulic Fracture Complexity: Diagnosis, Remediation, and Exploration, C. L. Cipolla, N. R. Warpinski, and M. J. Mayerhofer, 2008 SPE Asia Pacific Oil & Gas Conference, Perth Australia, Oct. 20-22, 2008.

Practical Statistics for Astronomers, J.V. Wall and C. R. Jenkins, United Kingdom at the University Press, Cambridge, 2003, (pp. 156-157).

Fault Activation During Hydraulic Fracturing, S. C. Maxwell, M. Jones, R. Parker, S. Miong, S. Leaney, D. Dorval, D. D'Amico, J. Logel, E. Anderson and K. Hammermaster, SEG Houston 2009 International Exposition and Annual Meeting, Houston, TX, USA.

SPE 125239—Intergrating Microseismic Monitoring with Well Completions, Reservoir Behavior, and Rock Mechanics, N. R. Warpinski, 2009 SPE Tight Gas Completions Conference, San Antonio, TX, USA, Jun. 15-17, 2009.

SPE 131776—An Evaluation of Microseismic Monitoring of Lenticular Tight-Sandstone Stimulations, N. R. Warpinski, C.K. Waltman, and L. Weijers, SPE Unconventional Gas Conference, Pittsburgh PA, USA, Feb. 23-25, 2010.

SPE 131779—Unconventional Geophysics for Unconventional Plays, J. P. Rich and M. Ammerman, SPE Unconventional Gas Conference,Pittsburgh, PA, USA, Feb. 23-25, 2010.

Seismogenic index and magnitude probability of earthquakes induced during reservoir fluid stimulations, Serge A. Shapiro, Carsten Dinske, and Cornelius Langenbruch, Friedemann Wenzel, The Leading Edge, pp. 304-309, Mar. 2010.

Lynden-Bell, D. 1971. A method of allowing for known observational selection in small samples applied to 3CR quasars, Mon. Not. R. Astr. Soc., 155, 95-118.

Lynden-Bell, D., "A method of allowing for known observational selection in small samples applied to 3CR quasars," Mon. Not. R. Astr. Soc., Feb. 12, 1971, pp. 95-118, vol. 155, Royal Astronomical Society.

Efron, B., and Petrosian V., "Nonparametric Methods for Doubly Truncated Data," Journal of the American Statistical Association, Sep. 1999, pp. 824-834, v.94, American Statistical Association.

Gutenberg, B., and Richter, C.F.,"Earthquake Magnitude, Intensity, Energy and Acceleration," Bull. Seismol.Soc. Amer., Jul. 1942, pp. 163-191, vol. 32, No. 3, California Institute of Technology, Pasadena, California.

Efron, B., "The jackknife, the bootstrap, and other resampling plans," Technical Report No. 63, Dec. 1980, Prepared under the Auspices of Public Health Service Grant 2 R01 GM21215-06, 140 pages total, Division of Biostatistics, Stanford University, Stanford, California, Also prepared under National Service Foundation Grant MCS 77-16974, and issued as Technical Report No. 163, Stanford University, Department of Statistics, ISBN 0-89871-179-7.

Wall J.V., and Jenkins C.R., Practical statistics for astronomers, 2003, ISBN 0-521-45416-6, Chapter 5.3: Non-parametric tests: single samples, pp. 89-91, Cambridge University Press, Cambridge, United Kingdom.

Wall J.V., and Jenkins C.R., Practical statistics for astronomers, 2003, ISBN 0-521-45416-6, Chapter 7.3: Luminosity (and other) functions, pp. 153-158, Cambridge University Press, Cambridge, United Kingdom.

Bretthorst, G.Larry, "How accurately can parameters from exponential models be estimated? A Bayesian view," Concepts in Magnetic Resonance Part A, 2005, pp. 73-83, vol. 27A, No. 2, DOI:10.1002/cmr.a.20044, Wiley Interscience Periodicals, Inc.

Bretthorst, G. Larry, "Bayesian analysis. II. Signal Detection and Model Selection," J. Magn. Reson., 1990, pp. 552-570, vol. 88, Academic Press, Inc.

Rutledge, James T. and Phillips, W. Scott, "Hydraulic stimulation of natural fractures as revealed by induced microearthquakes, Carthage Cotton Valley gas field, east Texas," Geophysics, Mar.-Apr. 2003, pp. 441-452, vol. 68, No. 2, Society of Exploration Geophysicists.

Aki, K. and Richards, Paul G., Quantitative Seismology 2nd edition, 2002, Chapter 4: Elastic Waves from a Point Dislocation Source, pp. 106-110, University Science Books, Sausalito, CA, USA, ISBN 0-935702-96-2.

Aki, K., "Maximum likelihood estimate of b in the formula logN=a-bM and its confidence limits," Bulletin of the earthquake research institute, Mar. 1965, vol. 43, pp. 237-239.

Beeney et al., "Relating Surface Seismic Attributes to Borehole and Core Measurements: A Case Study in the Barnett Shale, USA," EAGE/SEG Research Workshop 2007, Sep. 3-6, 2007, Perugia, Italy, 5 pages total.

* cited by examiner

*Primary Examiner* — Edward Cosimano

(74) *Attorney, Agent, or Firm* — Rachel E. Greene; Tim Curington

(57) ABSTRACT

Embodiments of this invention relate to compositions and methods of processing a subterranean formation including collecting microseismic data from one wellbore, collecting amplitude ratio information for the microseismic data, comparing the amplitude ratio to an expected ratio, generating a representation of a formation based on the microseismic data and the comparison of the amplitude ratio and expected ratio, and performing an oil field services activity based on the representation.

20 Claims, 19 Drawing Sheets

SYSTEM AND METHOD FOR RECONSTRUCTING MICROSEISMIC EVENT STATISTICS FROM DETECTION LIMITED DATA

BACKGROUND OF THE INVENTION

1. Field of the Invention

This invention relates to methods and apparatus used in modeling and processing a subterranean formation. In particular, the invention relates to using the quantitative interpretation of microseismic data. Also in particular, the invention relates to methods to estimate the b-value, complete frequency-magnitude distribution, and detection limit curves for a formation.

2. Description of the Related Art

Hydraulic fracturing is used to increase hydrocarbon production. During a hydraulic fracture treatment, a fracturing fluid is injected at a pressure exceeding the in-situ stress of the target formation to create a large fracture. In a rock formation that does not contain extensive natural fractures, a single dominant fracture is created in the direction perpendicular to the minimum in-situ stress. The resulting fracture, filled with propping agent carried by the fluid, provides a highly conductive conduit to facilitate the flow of hydrocarbon into the wellbore.

In recent years, microseismic monitoring has been widely used in hydraulic fracture treatments to help determine the dimensions of the created hydraulic fracture. Often, during the hydraulic fracturing process, the natural fractures or faults existing in the formation undergo slippages along the natural fracture planes, triggering a series of small magnitude seismic waves traveling in the formation, called microseismic events, created by the stress increase and fluid filtration in the region surrounding the fracture. These microseismic events can be detected by a string of geophones located in a neighboring well or in one individual well. By processing the detected acoustic wave forms, the epicenter of each microseismic event can be determined. Collectively, the detected event locations form an estimate that encompasses the actual fracture being created. Based on the microseismic data, engineers can estimate the length and height of the hydraulic fracture. Human judgment is often relied upon to exclude isolated or sparse events in this exercise, leading to large uncertainties in the inferred fracture dimensions.

With increasing application of hydraulic fracturing in formations such as fractured shales, microseismic monitoring provides evidence that complex hydraulic fracture networks are created in the highly naturally fractured formation. Manual extraction of the fracture shape from a microseismic cloud is possible, but is quite challenging and highly uncertain. Thus, effective interpretation of microseismic events demands a robust and automated fracture extraction method. The use of the amplitude information to enhance microseismic map interpretation has been introduced. Various fracture complexity indicators may include seismic deformation information. However, a system is needed that relates the amplitude ratio for each observed event to the orientation of the major plane. Further, the system needs to provide a quantitative interpretation with assigned probabilities.

SUMMARY OF THE INVENTION

Embodiments of this invention relate to compositions and methods of processing a subterranean formation including collecting microseismic data from one wellbore, collecting amplitude ratio information for the microseismic data, comparing the amplitude ratio to an expected ratio, generating a representation of a formation based on the microseismic data and the comparison of the amplitude ratio and expected ratio, and performing a oil field services activity based on the representation.

DESCRIPTION OF THE INVENTION

Figure 1:
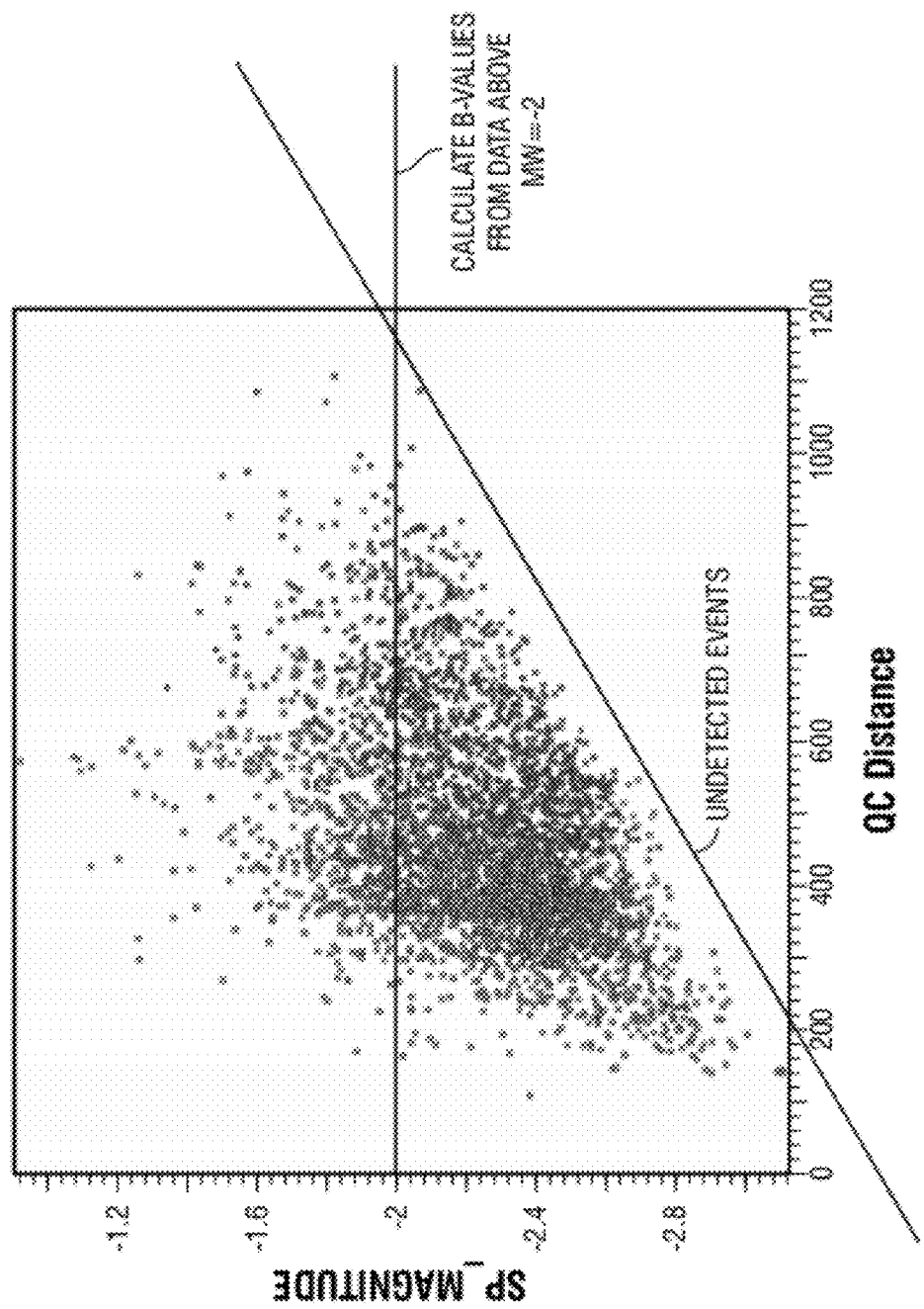
FIG. 1 is a plot of magnitude as a function of distance for an example of microseismic data.

Microseismic data contains a wealth of information about the source and the rock through which it propagates. This information is not easily recoverable since the source mechanism, location and time are not known at the outset and so all information can be recovered only by inversion or inferred using modeling. This invention relates to methods and apparatus to form and use.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited.

In the summary of the invention and this description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors have disclosed and enabled the entire range and all points within the range.

Embodiments of the invention consider a discrete set of interpretations and assign relative probabilities to those interpretations using the observed microseismicity. The interpretation is then achieved by application of Bayes Theorem:

$$P(\text{interpretation}|\text{microseismic}) = \frac{P(\text{microseismic}|\text{interpretation})P(\text{interpretation})}{P(\text{microseismic})}$$

P(interpretation|microseismic) is the probability distribution of the different proposed interpretations given the observed microseismic data.

P(microseismic|interpretation) is the probability distribution of observing the microseismic data, given the proposed interpretations.

P(interpretation) is the probability distribution of the proposed interpretations, before incorporating the microseismic information. This could be simply a flat distribution, or could be the distribution resulting from a previous interpretation. For example, one may have determined the relative probability of different n-plane solutions using only event locations and location uncertainty P(interpretation|microseismic), and then use that as the P(interpretation) for the analysis of amplitude-ratio information. Do not apply the same information twice (i.e. P(interpretation|microseismic) from amplitude analysis cannot be used as P(interpretation) for a re-interpretation of the amplitudes—this would lead to under-estimation of the uncertainty in the result).

P(microseismic) is the probability of observing the microseismic events, independent of the interpretations. In some studies, such as amplitude ratio analysis, this can be considered a constant; in studies which use magnitudes or the event number density, the probability distribution is affected strongly by detection limits.

In microseismic interpretation, particularly the evaluation of stimulated volume (ESV) and the estimation of b-values, the data are biased due to the monitoring geometry. The minimum magnitude event that can be reliably detected increases with distance and the volume of investigation increase with distance too. This leads immediately to a deficit in small events and an excess of large events versus distance from the monitoring well; removing these biases allows assuming P(microseismic) is a constant for all events. This affects all analysis that is based on magnitudes or cumulative event number, such as an Estimated Stimulated Volume (ESV) or Failed Reservoir Volume (FRV) and the interpretation of frequency-magnitude statistics ('b-value interpretation'). This detection bias is investigated and a statistically robust analysis is presented to both adjust ESVs and provide b-value interpretation for the single monitoring well case.

The prior probability of interpretations, P(interpretation), is derived from possible orientations of microseismic events taken from knowledge of geology or dips interpreted from Formation Microimager (FMI) logs. This same prior probability is useful in interpreting a fault-plane solution over the set of events. For example, inversion of an individual microseismic event to retrieve the moment tensor (source mechanism) requires a reasonable coverage of the radiation pattern.

Practically, microseismic information is limited to a single monitoring well and obtaining effective radiation pattern coverage for any individual event is extremely difficult or impossible. Thus, embodiments of the invention determine the predominant mechanism over a set of events. By assuming that the events, overall in a statistical sense, share a predominant mechanism, one can use all events together to invert for a characteristic source mechanism. If a number of potential candidate mechanisms are presented, embodiments of this method can assign their relative likelihoods.

Embodiments of the invention include a simplified geomechanical model of microseismicity that is suitable for calculation using the VISAGE finite element geomechanics simulator. It is shown that the inclusion of the physics-based simulator to forward model potential microseismic mechanisms based on the multiple planes interpretation provides strong constraints on the rake angle. Embodiments of the invention will benefit when this approach is used in combination with plane-interpretation to provide self-consistent interpretations of observed microseismicity.

Recovering Undetected Events

In any monitoring configuration, and particularly in the single-well monitoring case, high magnitude events are detectable at great distances, but small events are only detected close to the well. This is compounded by the field-of-view issue, the volume of rock that is observable for any given aperture increases with distance from the observing well. This means that if events occurred with a constant number density (i.e. per unit volume) one would still see an apparent profile versus distance.

In earthquake catalogue analysis, the approach is to take a minimum magnitude and discard all events below that magnitude from the analysis (known as the Magnitude of Completeness). This approach has also been tried in microseismic interpretation for HFM. The unfortunate consequence in the microseismic monitoring case is that the vast majority of events are discarded. Therefore, embodiments of the invention relate to a method to recover the amplitude distribution of the events using as many of the events as possible.

These detection issues are illustrated by a magnitude versus distance plot (FIG. 1). FIG. 1 illustrates typical microseismic events from a multistage hydraulic fracture treatment. In general b-values are calculated by discarding all events below Mw=−2. The region of undetected low amplitude events is marked.

It is helpful to consider a relevant analogy to the estimation of the Hubble Constant in astronomy. This requires an estimation of the stellar magnitude profile (number density and magnitude of stars), which suffers from the observation problem that we only observe stars from the Earth, so that very bright stars are observed at great distances and many nearby faint stars are seen. This problem was solved by Lynden-Bell and the solution, adjusted for microseismic data is sufficient in the single observing well case.

The general problem has been defined by Efron and Petrosian, and it is an initial part of some embodiments of the invention. One should consider $$f=(f_1, f_2, \ldots, f_n)$$

to be the probability $f_i$ of events with a magnitude greater than some nominal value, occurring at locations $y_i$. This is the distribution to try to recover, in the single well case $y_i$ are simply distances from the monitoring well; more generally in the multi-well case they are locations in (x,y,z). In practice, one will typically use n volume-bins for $y_i$ rather than a continuous representation.

The observations are $$F=(F_1, F_2, \ldots, F_n)$$

and correspond to the actual statistics of the observations (number of events above a certain magnitude observed at $y_i$).

Finally, J is an n-by-n detection matrix which will have $J_{ij}=1$ for a detectable event, $J_{ij}=0$ otherwise. If the matrix J is known then one solves the inverse problem:

$$F=Jf.$$

This was the problem treated by Efron and Petrosian. However, in the microseismic case, the ability to detect events falls off with signal-to-noise ratio and the location methods (for example, CMM which matches moveout across the array) may select correlated noise. Consequently, one needs to solve for J.

The Detection Limit

Embodiments of the invention consider a simple analytical alternative that will form a reasonable approximation, which can be updated rapidly during the determination of the detection limit J. The results of this (post-job) analysis can then be compared to the detection limit derived from initial modeling prior to the job. The detection limit derived from the data in this way may also be used to understand the region where correlated noise affects the event picking, which may in turn inform later reprocessing of the waveforms.

Initially, one assumes that the Moment represents a point source in a homogeneous medium so that its detectability goes as surface area of a sphere, $r^2$. Then, one considers the equivalent moments of sources by their geometric spreading as seen at the observing well, and define a property $\gamma^2$ that is related to the Moment and is independent of this geometric spreading:

$$M_0 = (\gamma r)^2$$

Putting this into the expression for Moment Magnitude, Mw:

$$\log_{10}(M_0) = 2\log_{10}(\gamma r) = 1.5 M_w + 16.1$$

For each event, solve for $\gamma$:

$$\gamma = \frac{10^{\left(\frac{1.5 M_w + 16.1}{2}\right)}}{r}$$

$\gamma$ is the Detectability of the event and, for a given magnitude, $M_W$, it falls off as 1/r. The detection limit J is then some contour of constant $\gamma$.

Reconstructing the Frequency-Magnitude Distribution

The frequency-magnitude distribution is recovered using a modified form of the Lynden-Bell reconstruction algorithm in a manner analogous to the observable limiting volume $V_{max}$. The method assumes that the distribution of magnitudes is bivariate and separable:

$$f(M_w, r) = f_1(M_w) f_2(r).$$

In addition to the magnitude-frequency distribution, the distance distribution can be recovered by Lynden-Bell's method. In the HFM case, assume that the events are clustered around the fracture or a fault that is activated (i.e. distributed in r) and the magnitude distribution is dictated by the rock or stimulation treatment (and so can be considered not distributed in r).

For a given value of $\gamma$ the modified form of the algorithm proceeds as follows:

1. Order the events in magnitude.
2. For the current event $M_{wi}$ (first event is largest magnitude), calculate the Test Distance, $r_{max}$, corresponding to the largest distance at which this magnitude could be detected, given the supplied value for $\gamma$.

$$r_{max} = \frac{10^{\left(\frac{1.5 M_{wi} + 16.1}{2}\right)}}{\gamma}$$

3. For each event $M_{wj} < M_{wi}$ compare its distance, $r_j$, to $r_{max}$. Count 1 for each $r_j < r_{max}$.
4. The total count for each event is $C_i$ take the next event and repeat steps 2&3 until all events have been analyzed.
5. The cumulative distribution can be reconstructed:

$$\int_0^{M_{wi}} \rho(M_W) dM_W \propto \prod_{k \leq i} \left(\frac{c_k + 1}{c_k}\right) \text{ with } \frac{c_1 + 1}{c_1} = 1$$

6. Finally normalized the distribution.

The Lynden-Bell Algorithm

The Lynden-Bell algorithm is also known as the $C^-$ method and is a maximum likelihood estimator for the recovered magnitude-frequency profile, $\rho(M_W)$. Here, the pseudo-code description of the method given by Wall and Jenkins is adopted, each microseismic event is at a distance, $R_i$ from the observing well and has a moment magnitude $M_{Wi}$:

Arrange the data $(R_i, M_{Wi})$ in moment magnitude order;

Set $C_i=0$;

For each $M_{Wj}<M_{Wi}$: add 1 to $C_i$ is this source has $\gamma_j>\gamma_i$;

Otherwise, go to the next $M_{Wi}$ until finished.

These C-numbers can then be used to construct the cumulative distribution of $M_W$:

$$\int_{M_{Wmin}}^{M_{Wi}} \rho(M_W) dM_W \propto \prod_{k<i} \left(\frac{C_k+1}{C_k}\right)$$

with a starting point of:

$$\frac{c_1+1}{c_1} = 1$$

The algorithm is based on an implicit assumption that the form of the magnitude-frequency profile is independent of distance, so this algorithm cannot resolve the events into separate sets corresponding to two different b-values (for example high b-value near a fracture and low b-value on a fault). That situation is handled by considering the two clusters of microseismic events, recovering b-values for each, and determining whether the two clusters represent significantly different b-values.

Figure 2:
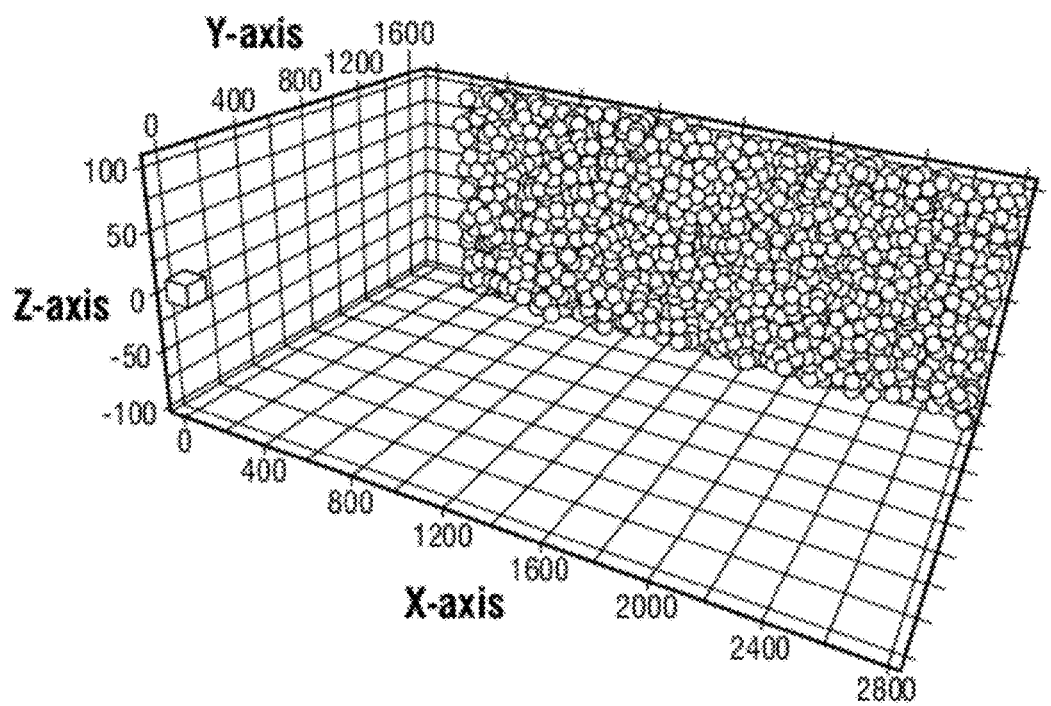
FIG. 2 shows the 3000 simulated microseismic event data.
Figure 3:
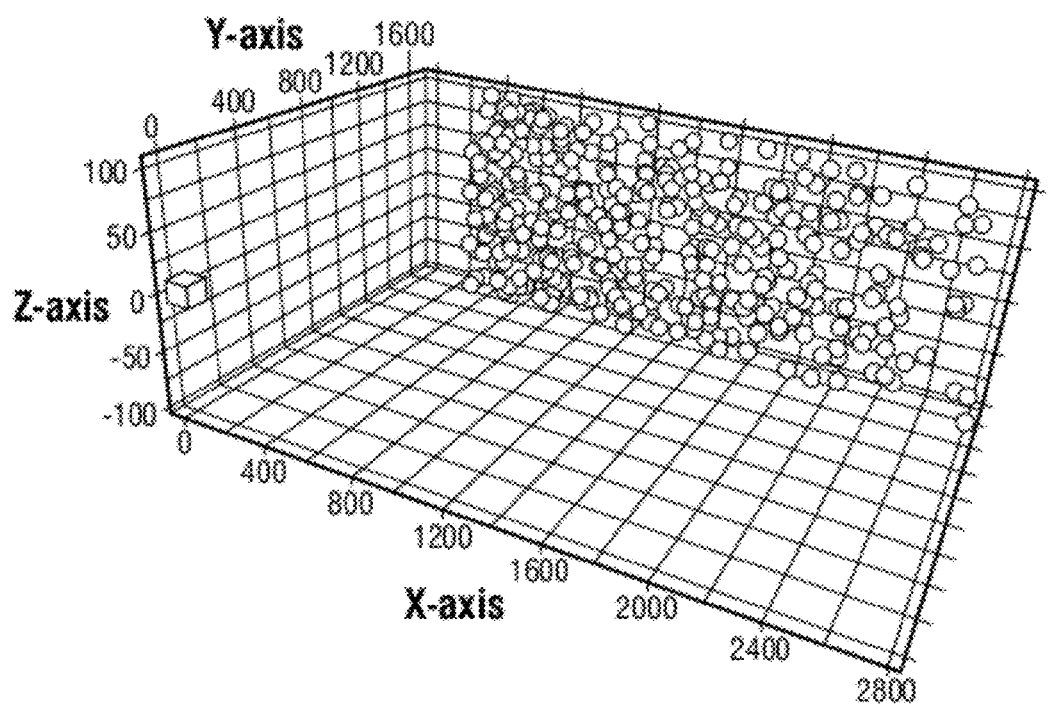
FIG. 3 shows the 369 detectable event data.
Figure 4:
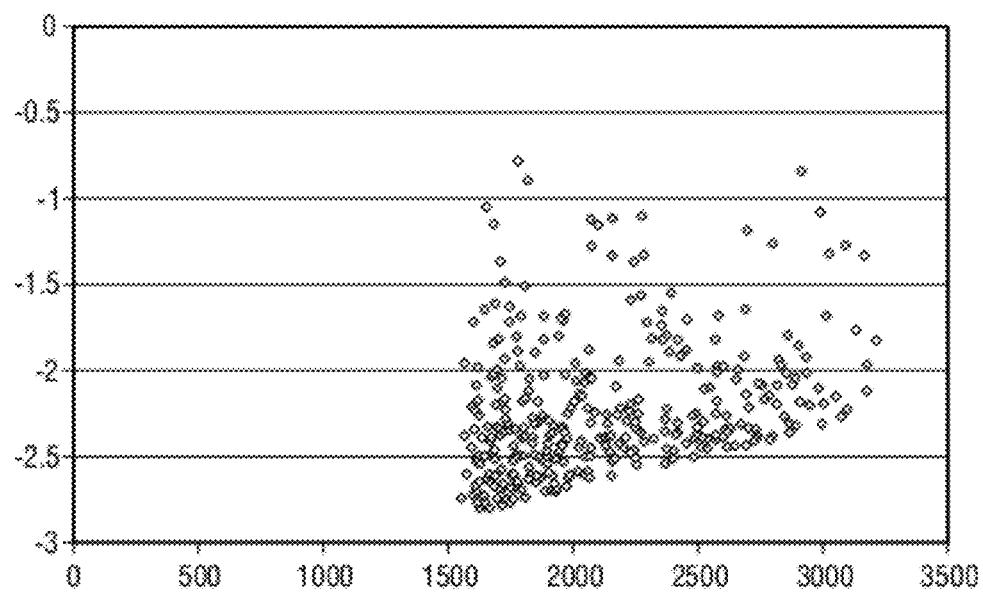
FIG. 4 illustrates magnitude vs. distance.
Figure 5:
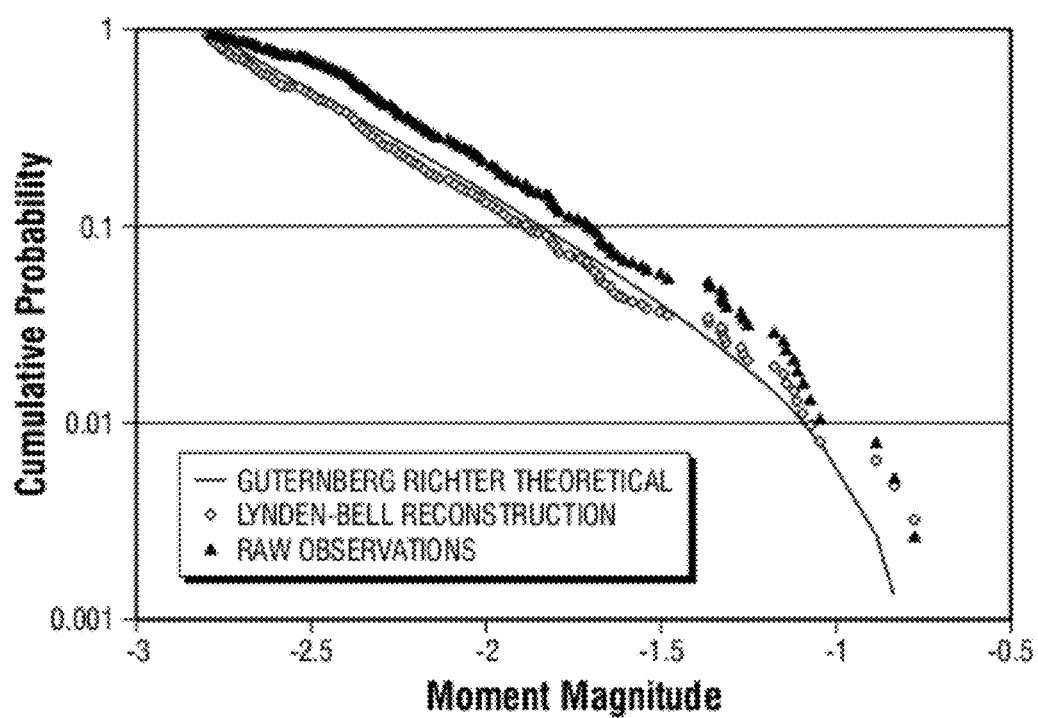
FIG. 5 compares the recovered profile, the profile obtained by a simple cumulative calculation, and the theoretical curve.

To provide a synthetic test of the Lynden-Bell algorithm, 3000 synthetic events were generated within a rectangular box 2500×200×50 ft that was positioned some 1600 ft from the observation point. The events had random location within that box and magnitudes governed by a Gutenberg-Richter distribution with a b-value of 1. A value of γ was selected such that the smallest detected event had a magnitude of −2.8, which removed all but 369 of the events. This is illustrated by FIG. 2 which shows the 3000 simulated microseismic events. FIG. 3 shows the 369 detectable events. FIG. 4 illustrates magnitude vs. distance and FIG. 5 compares the recovered profile, the profile obtained by a simple cumulative calculation, and the theoretical curve.

The Assumption of the Gutenberg-Richter Distribution

The Lynden-Bell algorithm provides a free-form solution, but relies on knowledge of the detection limit J. It is generally assumed that the magnitudes generated during hydraulic fracturing follow a Gutenberg-Richter distribution, similar to the distribution observed in earthquake seismology. This is not unreasonable if the probability of an event occurring at all follows a simple Poisson distribution, and if the event magnitude distribution is governed by events occurring at the weakest points in the formation. The Gutenberg-Richter distribution can provide the number of events of magnitudes between $M_{Wmin}$ and $M_W$:

$$N_{M_W} \propto (10^{-bM_{Wmin}} - 10^{-bM_W}).$$

If the microseismic event profile recovered using the Lynden-Bell algorithm is Gutenberg-Richter distributed the b-value is given by Aki's maximum likelihood estimate:

$$b = \frac{1}{2.3(\langle M_W \rangle - M_{Wmin})}.$$

This means that one can introduce a statistical test—if the recovered magnitude distribution differs significantly (e.g. at 5 percent significance) from the Gutenberg-Richter distribution with this b-value, then one rejects the hypothesis that the recovered profile is Gutenberg-Richter distributed. A suitable significance test is the Kolmogorov-Smirnov test because cumulative profiles exist. This will yields an algorithm to determine the detection limit J:

1. Order the Detectibilities, γ, from smallest to largest;
2. Take the next value of γ (smallest);
3. Reconstruct the profile using the Lynden-Bell algorithm;
4. Calculate the Gutenberg-Richter b-value for the recovered profile using Aki's relation; and,
5. Determine whether the reconstructed profile is different to the Gutenberg-Richter profile at 5 percent significance.
6. If 5 is true, go back to step 2 and take the next smallest value of γ.

The comparison of the reconstructed profile with the Gutenberg-Richter profile is a comparison of cumulative profiles and so the Kolmogorov-Smirnov test is a suitable tool.

Handling Small Sample Sizes and Running Window Estimates

The b-value may vary during a hydraulic fracture operation. However, in order to determine this, one must first place confidence intervals on the determination of b-values, so that one can detect whether different b-values significantly different in the statistical sense. This is particularly important when the sample size becomes small, as will be the case when one attempts to determine a running window b-value versus time.

For this, one uses the Bootstrap method devised by Efron, which is straight-forward and here also follows Wall and Jenkins:

1. Label each data point;
2. Draw at random a sample of N with replacement;
3. Recalculate the parameter; and,
4. Repeat many times.

The assumption here is that the data points are independent. The data points that are resampled come from the profile that is recovered using the Lynden-Bell algorithm. One does not repeat the determination of detection limit J for these sub-sampled data-sets, the goal is to determine the confidence interval on b-value given the value of J. Since the Bootstrap method is appropriate for small sample sets, it may be applied it to a subset of the observed events, allowing the use of a running time window. For such subsample sets the confidence interval on b-value will tend to be larger.

Separating b-Value Distributions

The b-value is a direct indicator of the ratio between larger and smaller events. The lower the b-value the more large events there are. Induced microseismicity at early times will consist predominantly of lower magnitude events (high b-value) and that activation of existing faults results in higher magnitude events (lower b-values).

Figure 22:
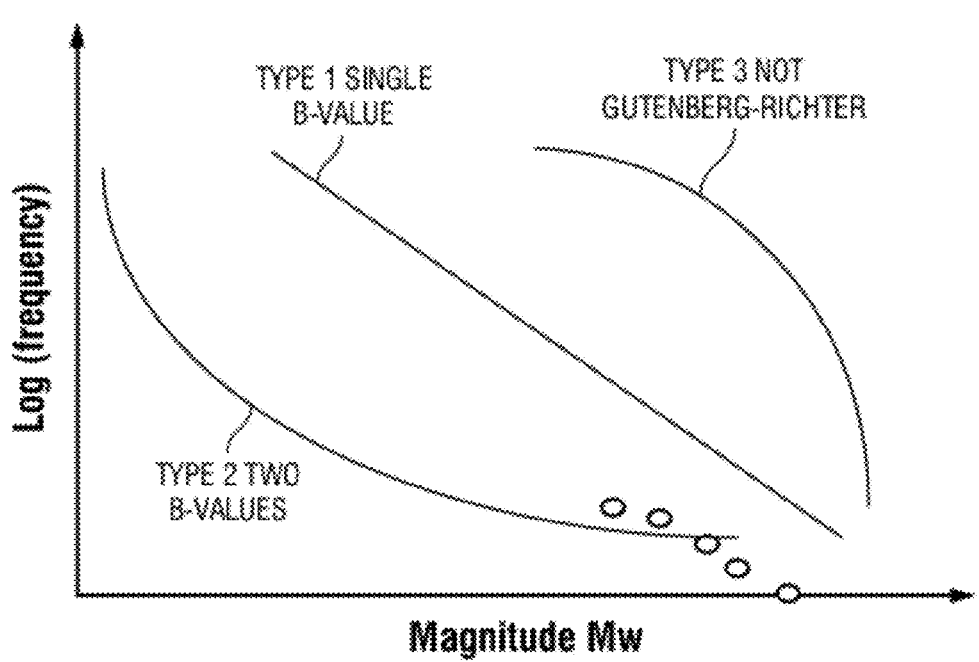
FIG. 22 is a plot of theoretical values of the log of frequency as a function of magnitude.

One cannot, however, analyze a single curve for multiple b-values. This is because the analysis is limited by the fact that the Gutenberg-Richter distribution is exponential in form. This restricts analysis of any recovered profile to be representable by a single b-value (a straight line in the log (frequency) vs Mw plot), two b-values (a line that curves down to the right) or not formed of exponential distributions (a line that curve up to the right) as illustrated by FIG. 22. Further, it is not possible to state unequivocally that the presence of a straight line indicates a single b-value; and importantly it is not possible to unambiguously recover two distinct b-values from the curve.

The reason for this inability to determine two b-values comes from examining the underlying combination of two exponential distributions:

$$N(M_W) = 10^{a_1 - b_1 M_W} + 10^{a_2 - b_2 M_W} = Ae^{-\alpha M_W} + Be^{-\beta M_W}.$$

This problem of fitting the sum of exponentials has received a lot of attention due to its importance in many areas of science, take the result of Bretthorst (2005) who provides an estimate for the standard deviation in estimating the parameter $\alpha$ as proportional to:

$$\left[\frac{\hat{\alpha} + \hat{\beta}}{\hat{\alpha} - \hat{\beta}}\right]^2.$$

Where the caret denotes the true values of $\alpha$ and $\beta$ which one hopes to recover. This is a multiplier on the standard deviation obtained when estimating a single exponential. If, somewhat optimistically, one estimates the error in the estimation in the single exponential case to be equal to the range of b-values that all pass the Kolmogorov-Smirnov test (around 0.1 to 0.2) and consider, for example b-values equal to 1 and 2, one can readily see that the standard deviation in estimating the b-values would be around 9 times the case for a single value and so is larger than the b-values themselves.

One can, however, split the data-sets spatially or temporally into clusters of events and determine a b-value for each cluster.

Whenever one splits a data-set into two sub-sets, one would like to determine not just the b-values for the subsets, but also the probability that they indeed correspond to separate sets. In this one needs to consider the accuracy of the obtained b-values. For any given b-value accuracy one can compare the confidence intervals for the b-values calculated for the separate sets, to the confidence interval one would obtain if all the events were treated as a single group.

One reconstructs the distribution of possible b-values using a bootstrap technique. This results in an estimate of the b-value distribution that is close to continuous (i.e. constructed from arbitrarily many sub-samples via bootstrapping), the distribution is also non-parametric. This means that techniques for resolving grouped data using the number of samples and standard deviations (e.g. Bretthorst 1990) are not directly applicable.

Figure 6:
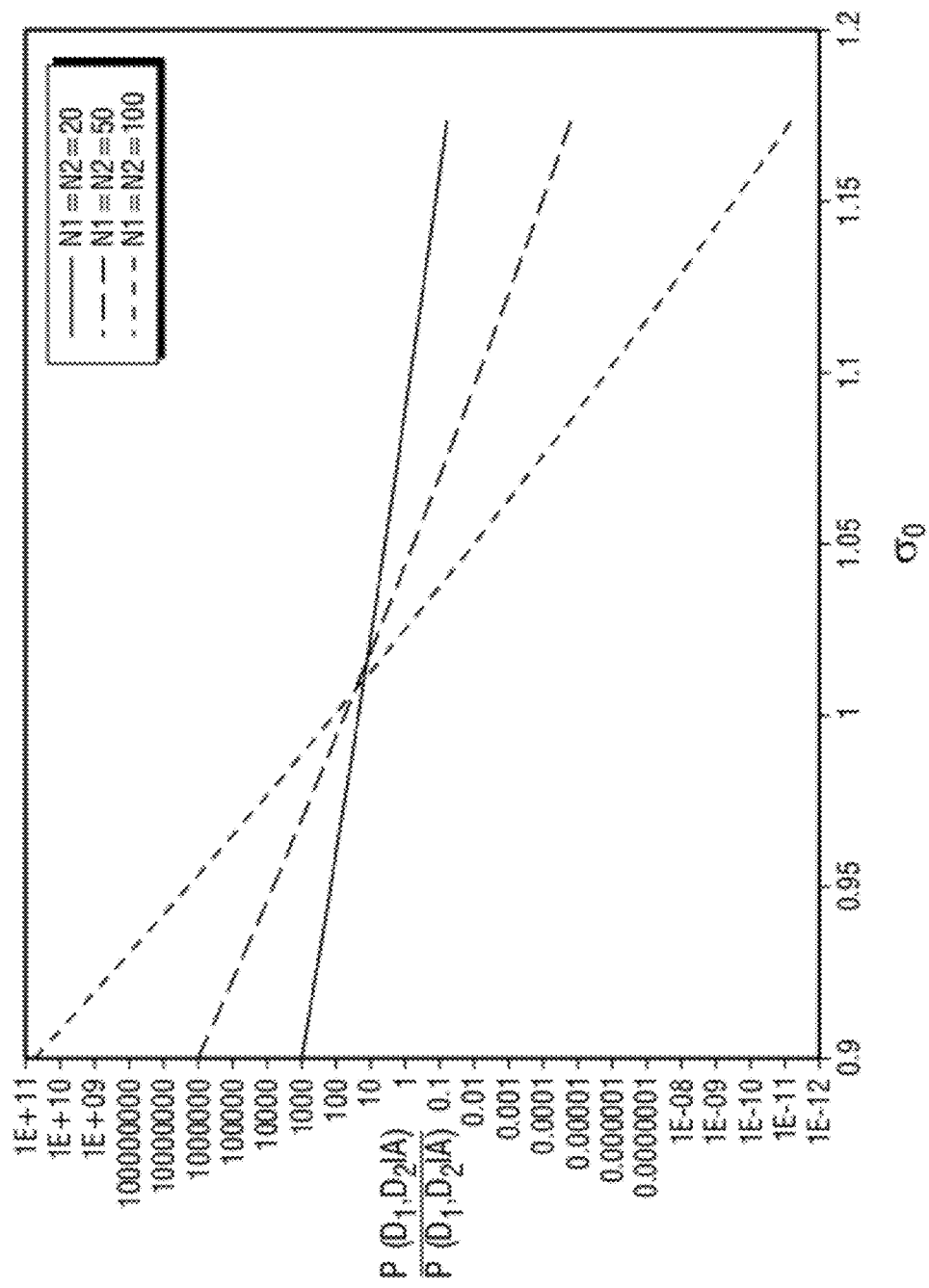
FIG. 6 illustrates that the variation of resolution with number of samples.

With reference to FIG. 6, the question to address is: 'Do we have more confidence, at a given accuracy, in the description as two distributions $A_1$ and $A_2$, corresponding to the groups $D_1$ and $D_2$; or in the description as a single distribution B?' The equation one is interested in will be the odds-ratio. For a given b-value range about the peak value, one wants to know:

$$\frac{P(A_1 b_{1min} < \langle b_1 \rangle < b_{1max} | D_1, I)}{P(A_2, b_{2min} < \langle b_2 \rangle < b_{2max} | D_2, I)}{P((B, b_{min} < \langle b \rangle < b_{max} | D_1, D_2, I))}$$

Where the ranges are equal:

$$b_{1max} - b_{1min} = b_{2max} - b_{2min} = b_{max} - b_{min}$$

If this ratio is larger than 1, it means that the two models $A_1$ and $A_2$ are sharply peaked compared to the single model B. Note that this ratio depends on the range chosen, if one considers a very large range then one will have a high confidence (i.e. close to 1) in all the expected values and so this ratio will tend to 1. In the limit of a zero range, one multiplies the peak probability of the two models $A_1$ and $A_2$, and this will likely be lower than the single peak of model B. In practice, one reports that the b-value estimates with a confidence interval (e.g. 80% or 90%), so one is interested in this ratio for ranges that encompass those confidence intervals.

Figure 23:
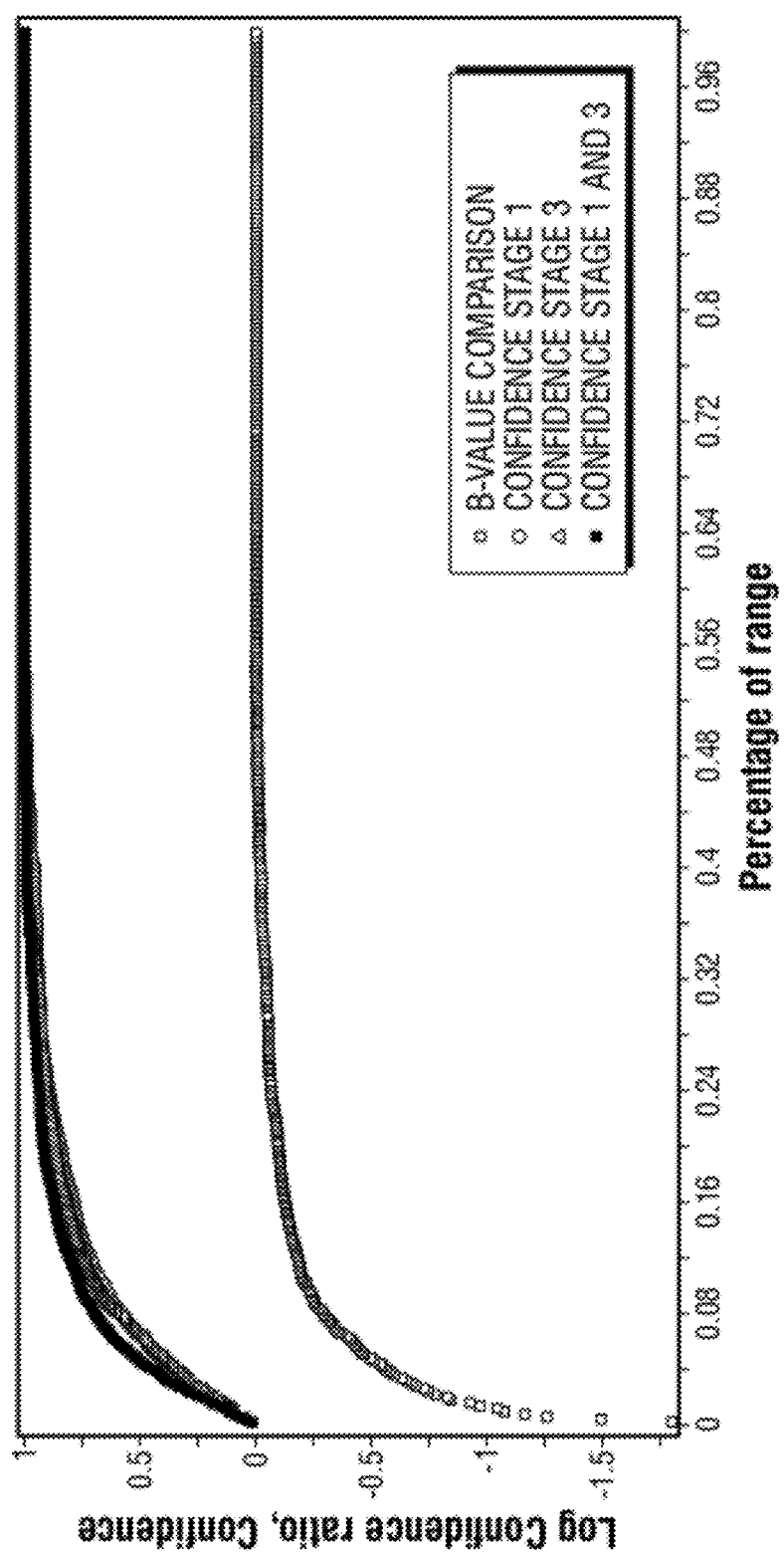
FIG. 23 is a plot with top curves that show the confidence varies away from the maximum likelihood estimate for the two separate sub-sets and the single combined dataset.

In FIG. 23, the top curves show the confidence varies away from the maximum likelihood estimate for the two separate sub-sets and the single combined dataset. The curve at the bottom shows the logarithm of the odds-ratio, in the example in FIG. 23, this stays below zero (i.e. odds-ratio<1) and so the two separate sub-sets are not preferred.

Amplitude Analysis Theory

The amplitude ratios, P/Sh, Sh/Sv and P/Sv, provide insight into the radiation pattern of the source. Previous studies have established the use of a locally prevalent natural fracture orientation as a constraint on the fault plane solution (FPS) of microseismic events observed from a limited aperture array. This approach is formalized in terms of a probability calculation to allow its robust and repeatable application. The measurements of amplitude ratios are dependent on the source signature but one does not expect them to vary between the low and high magnitude sources, so here one may treat P(microseismic) as a constant and one does not need to correct for data detection bias as performed for b-value analysis.

The P(interpretation) is a set of candidate source mechanisms. To assign P(interpretation) initially, prospective event orientations estimates are needed. For example, Rutledge and Phillips used information from boreholes to define a natural fracture orientation that was within 10° of the current maximum horizontal stress direction. In the discussion below, assume that some orientations are known from geological considerations or interpreted from FMI dips, but that rake angle is undetermined. As described below, the rake angle can be constrained by the geomechanical setting, if one makes some simplifying assumptions.

P(microseismic|interpretation) is the probability of obtaining the observed P/Sh amplitude ratio (for example), given the possible plane orientations. The uncertainty in event location provides an angular uncertainty, and the radiation pattern of the source is in a straight line to the receiver. For a given rake angle, the orientation of the event is a nuisance parameter:

$$P(\text{microseismic}|\text{interpretation}, \lambda) = \int P(\text{microseismic}|\text{interpretation}, \lambda, \theta_s, \phi_s) d\theta_s d\phi_s$$

In practice, the distribution P(microseismic|interpretation, $\lambda$) is constructed for different values of $\lambda$ and the maximum likelihood estimate of rake angle, $\lambda_0$, is the rake angle corresponding to the maximum of P(microseismic|interpretation, $\lambda$). Finally, with $\lambda_0$ determined, a representation of the microseismic events may be constructed under the assumption that the predominant mechanism is the only mechanism, by selecting the distribution of interpretations: P(interpretation|microseismic, $\lambda_0$), and assigning each event its most likely orientation. This pragmatic approach provides a useful visual tool to aid qualitative interpretation. However there is a risk of over-interpretation which is resolved below.

The Construction of the Prior, P(Interpretation)

There are many sources of information on the potential orientations expected for microseismic events, such as the following.
1. Natural fractures at outcrop;
2. The orientation of horizontal wells;
3. Permeability anisotropy from history matching a the reservoir simulation model;
4. Direct observations using the Formation Microimage (FMI) or inferred from dipole sonic logs;
5. A one-dimensional geomechanical model built for a single well; and,
6. A history-matched full-field geomechanical model.

Figure 7:
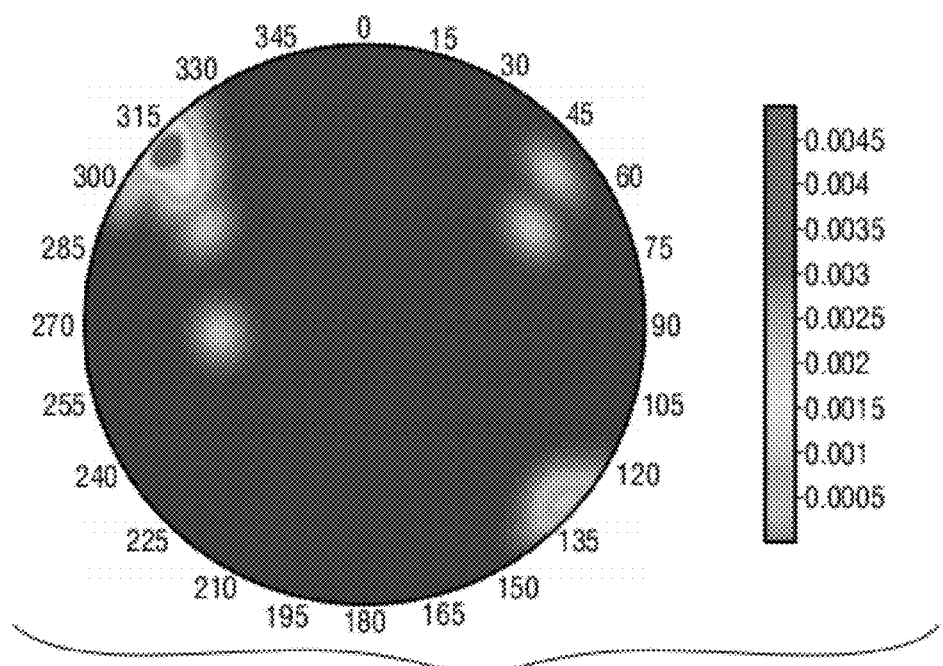
FIG. 7 is a chart representing historical information as a stereonet.

From these the prior probability of observing a particular orientation within the microseismic events can be constructed as a continuous Fisher distribution which is visualized as a stereonet in FIG. 7.

$$P((\text{interpretation}) \mid \delta, \phi_s) = \frac{\sum e^{\kappa_i \cos(\Delta\theta_i)}}{\int \sum e^{\kappa_i \cos(\Delta\theta_i)} d\theta d\phi_s}$$

Where here $\Delta\theta i$ is the angular distance between the orientation given by the dip-strike pair $(\delta,\phi_s)$ and the $i^{th}$ orientation in the prior and $\kappa_i$ is the measure of precision. The integral in the denominator simply normalizes P(interpretation) over all possible orientations.

The Likelihood of Observing the Amplitude Ratio Given the Event Mechanism P(microseismic|interpretation)

The following simplifying assumptions are made:
1. There is no isotropic component to the Moment Tensor.
2. One expects the dip and azimuth of microseismic events to follow expected natural fracture and hydraulic fracture orientations.
3. The amplitude ratios observed for an event are accurate, but the location of the event brings an uncertainty to the azimuth of the take-off angle (i.e. position in the radiation pattern leading to the amplitude ratio).
4. This uncertainty in take-off angle can be related directly to the projection of the location's uncertainty ellipsoid tangential to the line-of-flight.

It is possible to introduce the isotropic component as a nuisance parameter and integrate over a range of possible values. Instead, one may choose the assumption that the events are pure double-couple events. As a first-order approximation, one may assume straight rays so that the source radiation pattern can be used directly without any assumption of an intervening medium. This description of the method discusses only P/Sh amplitude ratios: the extension to P/Sv and Sv/Sh ratios follows immediately by analogy. Amplitude ratios could be available on a receiver-by-receiver basis, although current microseismic processing only returns a value of P/Sh averaged over the array.

Figure 8:
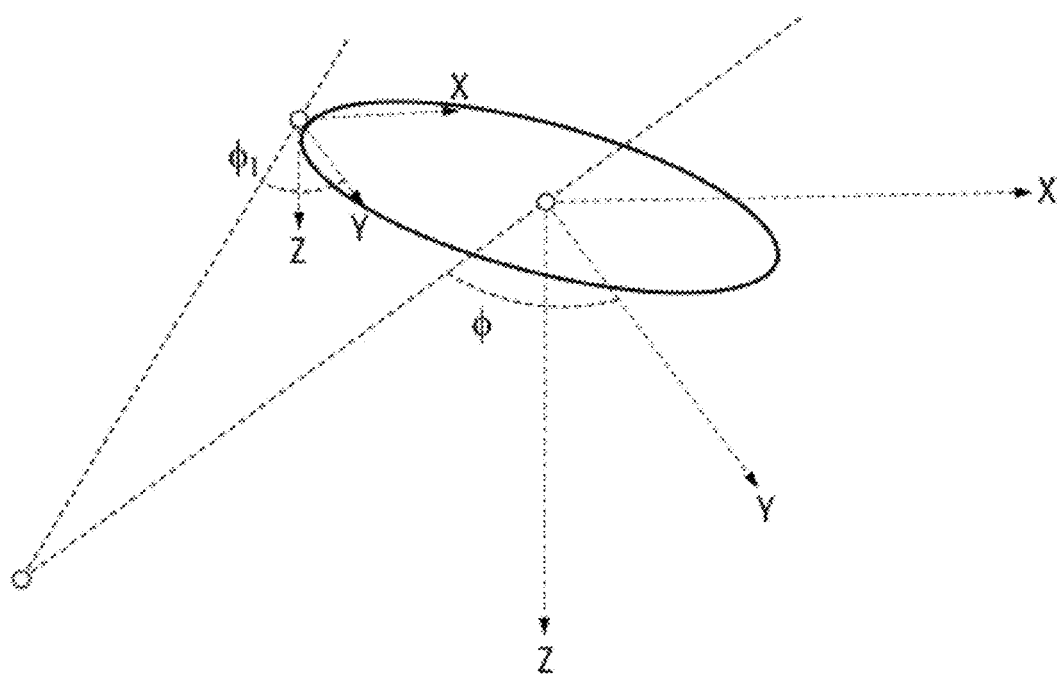
FIG. 8 is a chart of the amplitude ratio as having a location uncertainty on a Gaussian distribution of take-off angle, $i_\xi \pm \Delta i_\xi$.

In dealing with the observed amplitude ratio itself, the observation of amplitude ratio is accurate, but that the azimuth from which the observation came is uncertain. The event location provides the most likely azimuth and the major axis of the uncertainty ellipsoid provides an azimuthal uncertainty, which, for embodiments of the invention, is one standard deviation in a Gaussian distribution. An amplitude ratio measurement, $A_{P/Sh}$, and a probability of where that measurement originated given by $\phi+\Delta\phi$, where $\phi$ is the source-receiver azimuth follows the nomenclature of Aki and Richards. FIG. 8 illustrates how this uncertainty in source-receiver azimuth is assigned. The amplitude ratio is interpreted as having a location uncertainty on a Gaussian distribution of take-off angle, $i\bar{\xi}\pm\Delta i\bar{\xi}$. This distribution is assigned based on the take-off angle at the recovered event location, and the take-off angles based on the uncertainty ellipsoid. The take-off angle $i_\xi$, is fixed simply by straight-ray geometry, an alternative would be to include an uncertainty in both source-receiver azimuth and take-off angle based on hodogram analysis.

Figure 9:
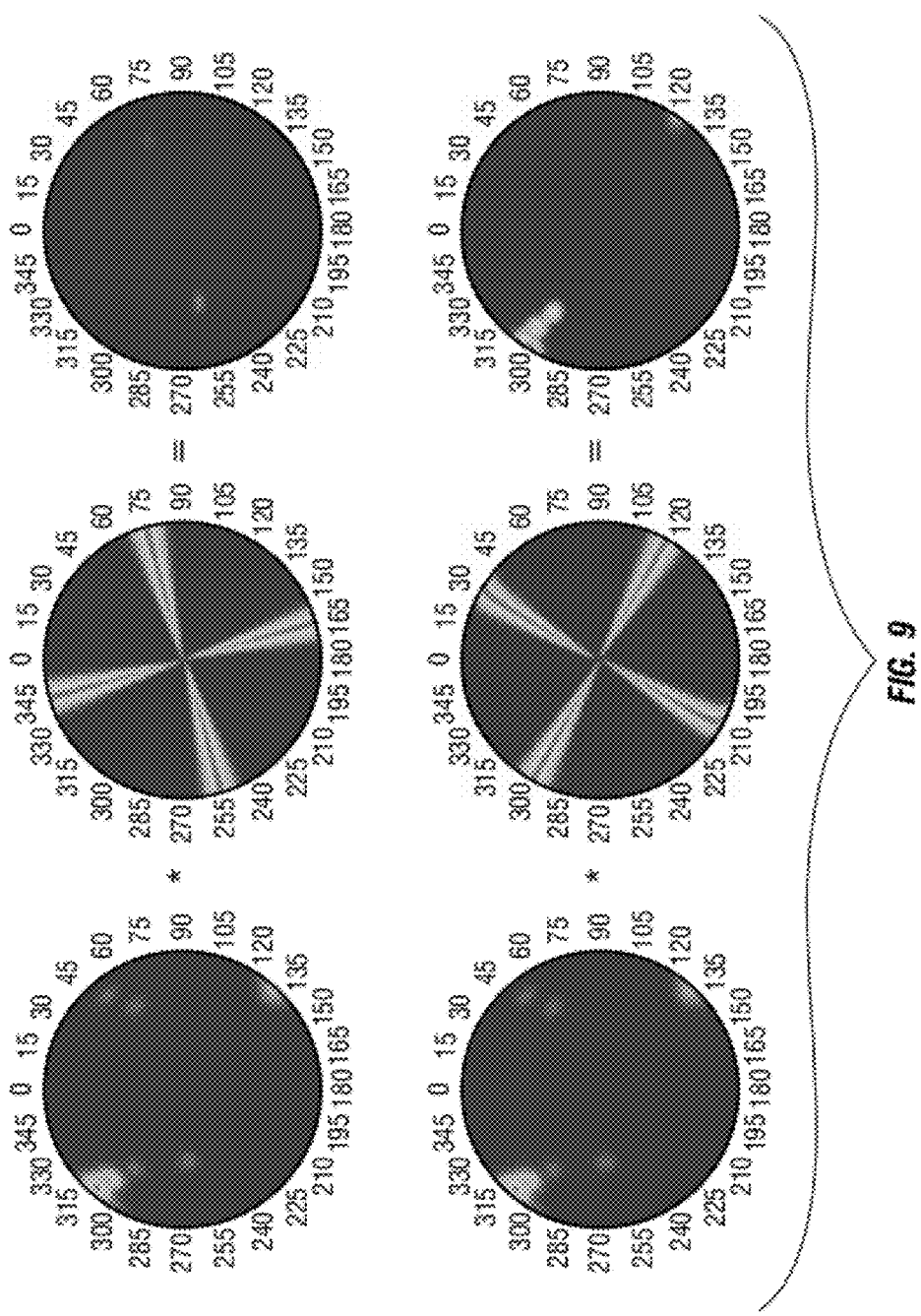
FIG. 9 is a theoretical curve as shown of modeled amplitude ratios $A_M$ which will contain an observed value of P/Sh multiple times calculation of probability with the prior (marked FMI) and the P(microseismic|interpretation).

For each microseismic event, $D_i$, it is desirable to calculate the likelihood of obtaining the observed amplitude ratio, $A_{P/Sh}$. For a given strike, $\phi_s$, dip, $\delta$, rake $\lambda$, take off angle $i_\xi$ one calculates the variation in amplitude ratio with source-receiver azimuth. This results in a theoretical curve as shown in FIG. 9 of modeled amplitude ratios $A_M$ which will contain the observed value of P/Sh multiple times. One assigns P(microseismic|interpretation) to be equal to the probability that the source-receiver azimuth were such that the observed value of P/Sh would be seen. Since there are multiple values and the appropriate source-receiver azimuth is one or another of them, one uses OR to combine the probabilities.

$$P(D_i(i_\xi) \mid \phi_s, \delta, \lambda) = \sum_{A_M(x)=A_{P/Sh}} \frac{1}{\Delta\phi\sqrt{2\pi}} \exp\left(-\frac{(x-\phi)^2}{2(\Delta\phi)^2}\right)$$

For a fixed rake $\lambda$ and take off angle $i_\xi$, one varies strike $\phi_s$ and dip, $\delta$, constructing a stereonet of the probability P(microseismic|interpretation). At this point, P(interpretation) is represented as a probability over the sphere (orientations of possible planes on a stereonet); P(microseismic|interpretation) is for a fixed rake $\lambda$ and take off angle $i_\xi$, similarly defined over the sphere; and P(microseismic) is considered constant. Thus, for every event, the stereonet of possible orientations (given rake) may be constructed. FIG. 9 illustrates the calculation of probability in practice. The prior (marked FMI) and the P(microseismic|interpretation) are multiplied together to get P(interpretation|microseismic).

To determine rake over the set rather than the orientation of any particular event, the sum of the probability over the sphere is performed (i.e. marginalize over orientation) (Note that one assumes $i_\xi$ is fixed by geometry and so does not appear in the following equation).

$$P(D_i \mid \lambda) = \int P(D_i \mid \lambda, \theta, \phi_s) d\theta d\phi_s$$

To seek the rake angle of the predominant mechanism, one looks for the rake angle that best describes event 1 AND event 2 AND event 3 etc.

$$P(D \mid \lambda) = \prod_i P(D_i \mid \lambda)$$

By repeating the calculation over a number of rake angles (which is assumed to be an exhaustive set of the possible rake angles), one may calculate the relative likelihood of the different rake angles.

$$P(D \mid \lambda) = P(D \mid \lambda = \{\lambda_1, \lambda_2, \ldots, \lambda_j, \ldots, \lambda_n\}) = \sum_j P(D \mid \lambda_j) = 1$$

The rake angle, $\lambda_0$, corresponding to the maximum of $P(D|\lambda)$ is the Maximum Likelihood estimate of rake angle. In some of the examples described below, the posterior distribution is sharply spiked and so the Maximum Likelihood estimate is a useful summary of the results.

Figure 10:
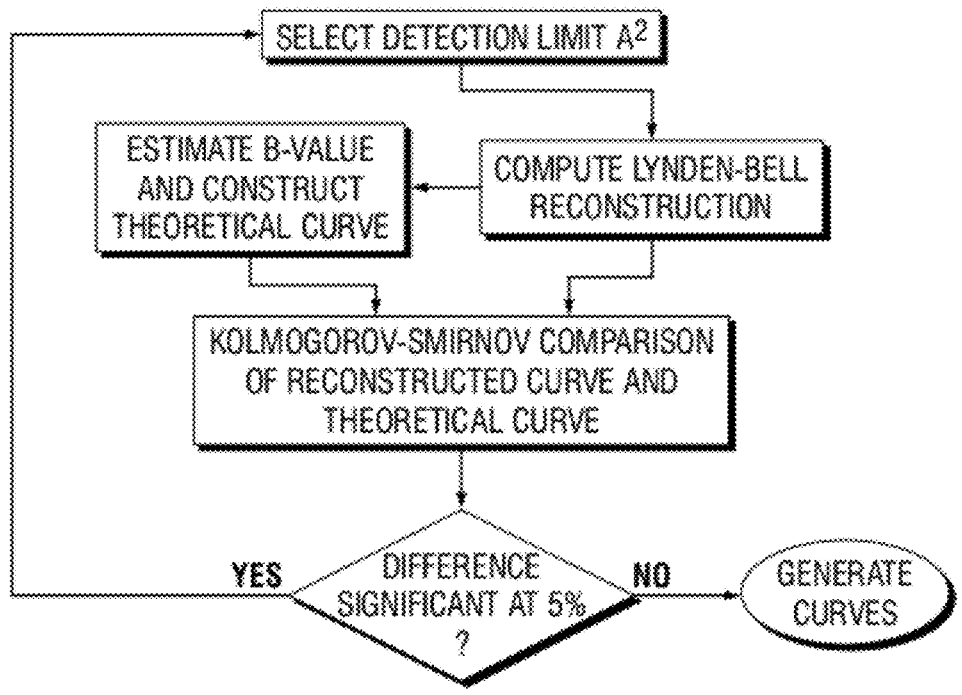
FIG. 10 is a flow chart illustrating one mathematical model for an embodiment of the invention.

Some embodiments of the invention may benefit from a more refined approach. The main flow of the method is given in FIG. 10. The component parts are defined in more detail below. Often, the frequency-magnitude distribution is a number-density distribution, but the observations are made in a volume of the reservoir, that volume for any given solid angle, increases with distance from the receivers. For embodiments of the invention, the distance to an event as the minimum distance from the event location to a receiver in the monitoring array. The Moment Magnitude is assumed for reported event magnitudes.

At the detection limit, one expects to observe some false events, these will have random magnitudes, but those magnitudes will be strongly correlated to distance from the receivers.

Here, one recovers the frequency-magnitude distribution iteratively by reconstructing the distribution against a detection-limit using a modified Lynden-Bell method, determining a Gutenberg-Richter b-value using the Maximum Likelihood estimate of Aki, and comparing the reconstructed distribution to the theoretical distribution using the Kolmogorov-Smirnov test. If the reconstructed distribution is not a Gutenberg-Richter distribution with the proposed b-value (at 5% significance), one raises the detection level and re-computes.

In this way, one recovers estimations of the b-value, the complete frequency-magnitude distribution and the detection limit curve.

Kolmogorov-Smirnov Test

The Komogorov-Smirnov test is valid for comparing cumulative distributions. In this case, one compares the cumulative distribution that has been reconstructed to the theoretical distribution corresponding to the estimated b-value. One compares the curves at 5 percent significance to determine whether the reconstructed curve corresponds to the Gutenberg-Richter curve. If it does not, one performs another iteration with the next γ value.

Time-Window or Cluster Analysis

Embodiments of the invention make better use of the low magnitude data that lie near to the monitoring well and considers events relative to the detection limit rather than on a purely magnitude basis. These benefits, along with the modified Lynden-Bell algorithm that recovers the frequency-magnitude distribution, mean that more events are usable in the analysis. Consequently this analysis can be used with smaller groups of data, either using a running time window or for recovering the frequency-magnitude distribution of a cluster of events identified by some other means.

The process of obtaining microseismic event orientations from amplitude ratio information alone requires judicious use of prior information on the expected orientations. This is necessary to compensate for the lack of information afforded by the observing geometry. The results can contain artifacts of the choice of prior, a discussion of how this occurs and a visual aid to interpreting results can help identify when this may be a problem.

Figure 20:
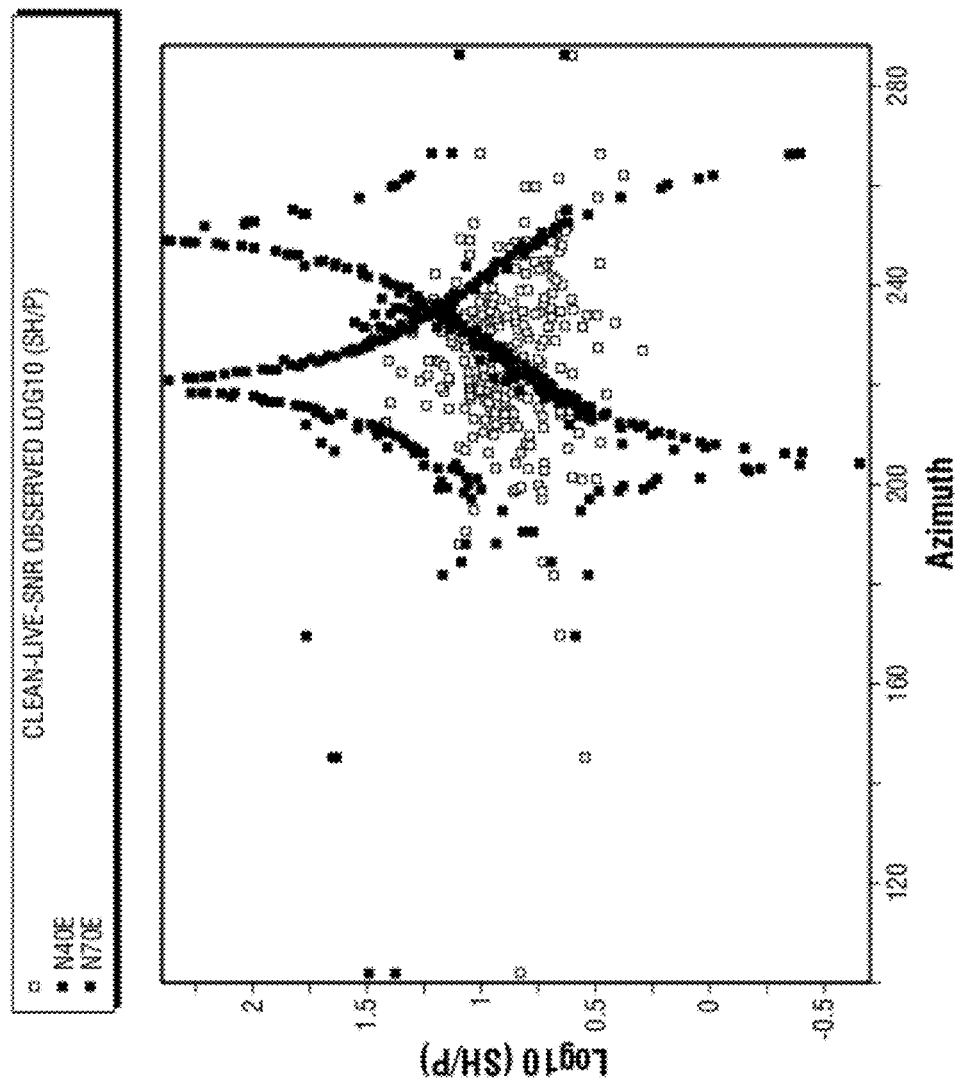
FIG. 20 plots theoretical curves corresponding to the projection of the possible orientations onto the log(Sh/P) vs Azimuth space.
Figure 21:
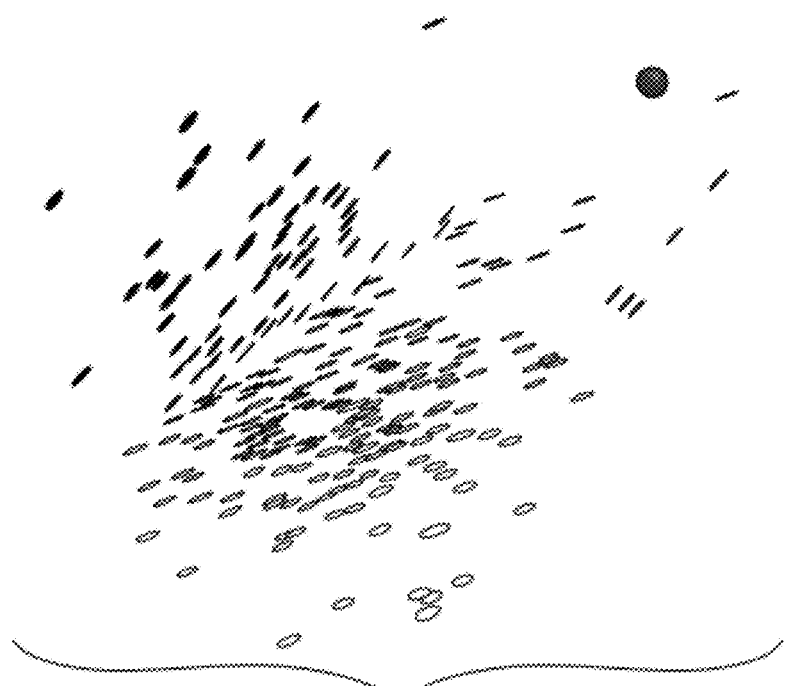
FIG. 21 is a three dimensional plot of the data used in FIG. 20.

In using a discrete number of possible orientations, it will always be the case that the theoretical curves corresponding to the projection of the possible orientations onto the log(Sh/P) vs Azimuth space will result in crossing curves (FIGS. 20 and 21). Clearly where the theoretical curves predict similar Sh/P ratios for multiple orientations, then the interpretation will be completely ambiguous and the data are not informative at that point. The prior in these regions is already showing that one cannot infer orientation, but since the method returns only the most likely orientation, the results do not immediately reflect these ambiguous regions. However, it is straight forward to construct a plane through the observation point corresponding to the azimuth at which the theoretical curves cross. Viewing this plane in the 3D view, alongside the inferred orientations for the events, it is possible to identify the regions where the interpretation may be ambiguous and it can be used to understand regions where a change in azimuth of the bulk of events may be an artifact of the interpretation rather than due to geology.

At the opposite end of the scale, if one is examining only two orientations, the theoretical curves will have different nodal planes. At the azimuth of the nodal plane for one orientation one has only the other orientation—in such situations the best-fit orientation is, therefore, unambiguously determined in the absence of the data so again the interpretation is biased. Again a representation of the nodal plane in the 3D view of the data can help to identify the region where the recovered orientations are subject to bias.

In some embodiments, a specific process may be used as follows. One assigns a classification to each microseismic event as follows:

1. Define a discrete set of orientations (dip, azimuth) for the induced fracture direction (HF) and the possible natural fracture directions (NF1, NF2, . . . , NFn).
2. Initially classify the microseismic events according to their amplitude ratio information.
   a. The amplitude ratio for a given event is compared to the amplitude ratio expected for a microseismic event on each of the possible fracture directions defined in step 1 given a discrete set of possible failure modes (e.g. strike-slip, dip-slip and tensile). This comparison is made by assigning a probability (e.g. by least squares) for observing the measured amplitude ratio given the orientations and failure modes, assuming that these form an exhaustive set. Representations of the microseismic events are generated for the possible interpretations.
3. A quantitative identification of the major planes is made following the method of Williams and Khadhraoui as described above.
4. The two interpretations can be combined to offer the following classification of events (each contains a sub-categorization of tensile (fluid-filled) or slip (which can be fluid-filled or not):
   a. Microseismic events occurring along the same direction as their associated major plane, where that major plane is HF. These are microseismic events associated directly with hydraulic fracture propagation.
   b. Microseismic events occurring along a natural fracture orientation (NF1, NF2, NF3 . . . ) where their associated plane is HF. These are microseismic events associated with potential fissure opening, here the difference between tensile and slip failures will greatly aid the interpretation.
   c. Microseismic events occurring along the same direction as their associated major plane, where that major plane is NFi. These are microseismic events associated with natural fracture propagation or the activation of a large natural fracture.
   d. Microseismic events occurring along the HF direction, with one of the natural fracture directions as their major plane. These events may indicate a path for fluid loss (i.e. conductive natural fracture).
   e. Microseismic events occurring along one of the NFi directions associated with a different NFi direction. These events would indicate that there is sufficient existing fracture permeability to prevent the formation failing in the HF direction. Such interpretations can be aided by the use of pumping information (see step 6).

f. Microseismic events occurring along HF or NFi directions in the vicinity of the wellbore, where the wellbore acts like the major plane. These events may indicate a casing failure.

5. Geomechanical interpretation of the fracture network's propagation.
   a. Multiple realizations of the combined interpretation can be generated with the information provided. The probability of each possible interpretation is fully characterized and so geomechanical interpretations attached to particular realizations may be compared, even in the case where the geomechanical interpretation remains essentially qualitative. In the simplest case, the most probable set of major planes may be combined with the most probable microseismic event orientations for a deterministic interpretation.

6. Updating the interpretation with new information
   a. Further geomechanical considerations or additional reservoir measurements (e.g. pumping information from the fracture treatment) can be used to further update the probabilities to provide a refined view of the fracture map.

Some embodiments of the invention may benefit from the following variations.

1. The microseismic amplitude identification method (step 2) could be considered a clustering algorithm, with all microseismic events identified as having similar orientation and failure mode used to define a set of microseismic events for the plane identification (step 3).
2. Moment tensor inversion to provide full focal mechanism information could be used in place of step 2 where such inversion is possible (for example in a multi-well geometry).
3. The results (probabilities on each orientation and failure mode) from multiple microseismic identifications, based on different receiver locations (for example from a horizontal monitoring well, or in a multi-well monitoring case where geometry precludes moment tensor inversion) may be combined using AND to provide further refinement to the microseismic interpretation.
4. A prior probability of observing microseismic events with a particular failure mode may be used in assigning the probabilities in step 2a.
5. The scale size of a microseismic event, where known, may be used to scale the plane used to represent the microseismic event.
6. Temporal analysis of the realizations generated for step 5 can aid in the geomechanical interpretation and be used to rule out unphysical results.
7. Analysis of the realizations using a fracture simulator or via a coupled ECLIPSE-VISAGE model can also be used in steps 5 and 6 to further refine the interpretation.

The representations of a formation generated by embodiments of the invention may be used to perform any oil field service including drilling, fracturing, stimulating, completions, perforating, coil tubing activities, or any other service that requires an estimate of the properties of the formation.

EXAMPLES

The following examples are presented to illustrate the preparation and properties of subterranean formations and/or fluid systems, and should not be construed to limit the scope of the invention, unless otherwise expressly indicated in the appended claims. All percentages, concentrations, ratios, parts, etc. are by weight unless otherwise noted or apparent from the context of their use.

Khazakstan

The first example is based on microseismic reservoir monitoring (MRM) data from Kazakhstan, where much of the seismicity appears to be associated with faults that surround the flanks of the dome, one would expect such microseismicity to have a b-value close to 1. This full-field microseismic monitoring project in Kazakhstan has been monitoring microsiesmicity for 2 years. The field is dome shaped and much of the microseismicity has occurred in the vicinity of faults that mark the field boundaries. Of particular interest are some microseismic events that occur very close to wells that are currently being drilled. Consider the events close to wells that are being drilled to largely be induced events that will be small in scale size, and so will show a disproportionate number of low magnitude events (i.e. a high b-value). The main microseismicity occurs near natural features and one would expect the b-value here to be close to 1.

Bakken Shale

Figure 11:
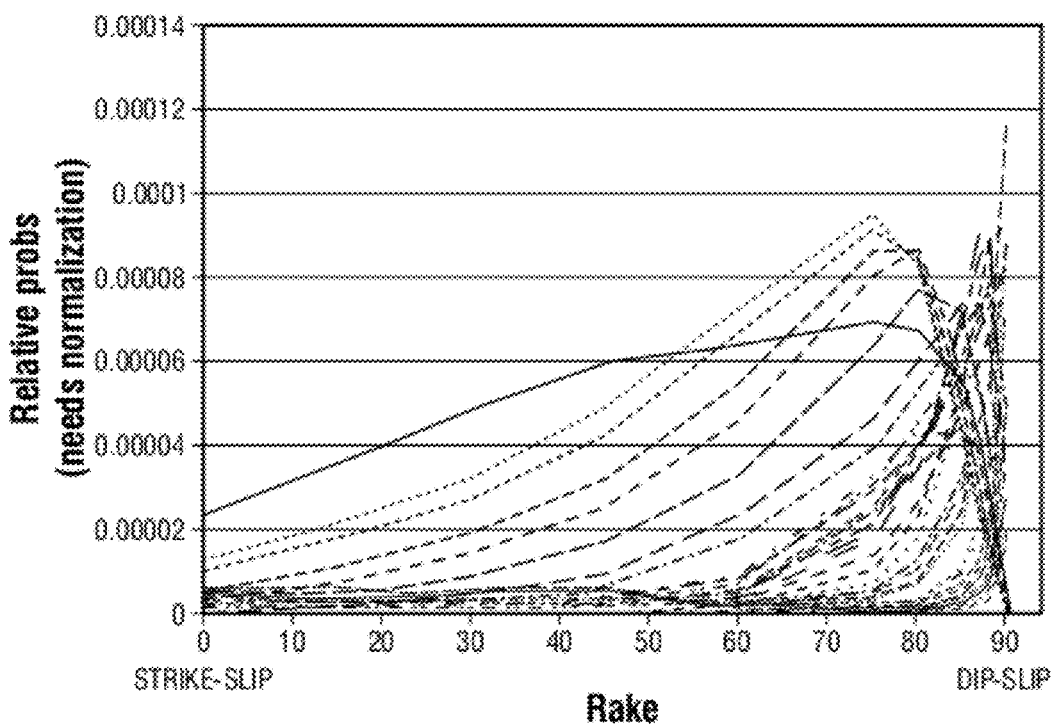
FIG. 11 plots microseismic events, relative probability versus rake angle for the Bakken Shale example described below.

This example comes from the Bakken Shale, where the predominant mechanism is considered to be dip-slip. Here rake angles were taken in ten degree intervals from zero to 90°. The small number of events (54) means that the results can be displayed graphically (FIG. 11). FIG. 11 plots every microseismic event, relative probability versus rake angle. It can be seen that, for most microseismic events, the results are ambiguous; however taking all events together (which means AND, so all the traces are multiplied), suppresses the strike-slip end in favor of the dip-slip end and based on this analysis, supports the view that events are predominantly dip-slip.

Barnett Shale

Figure 12:
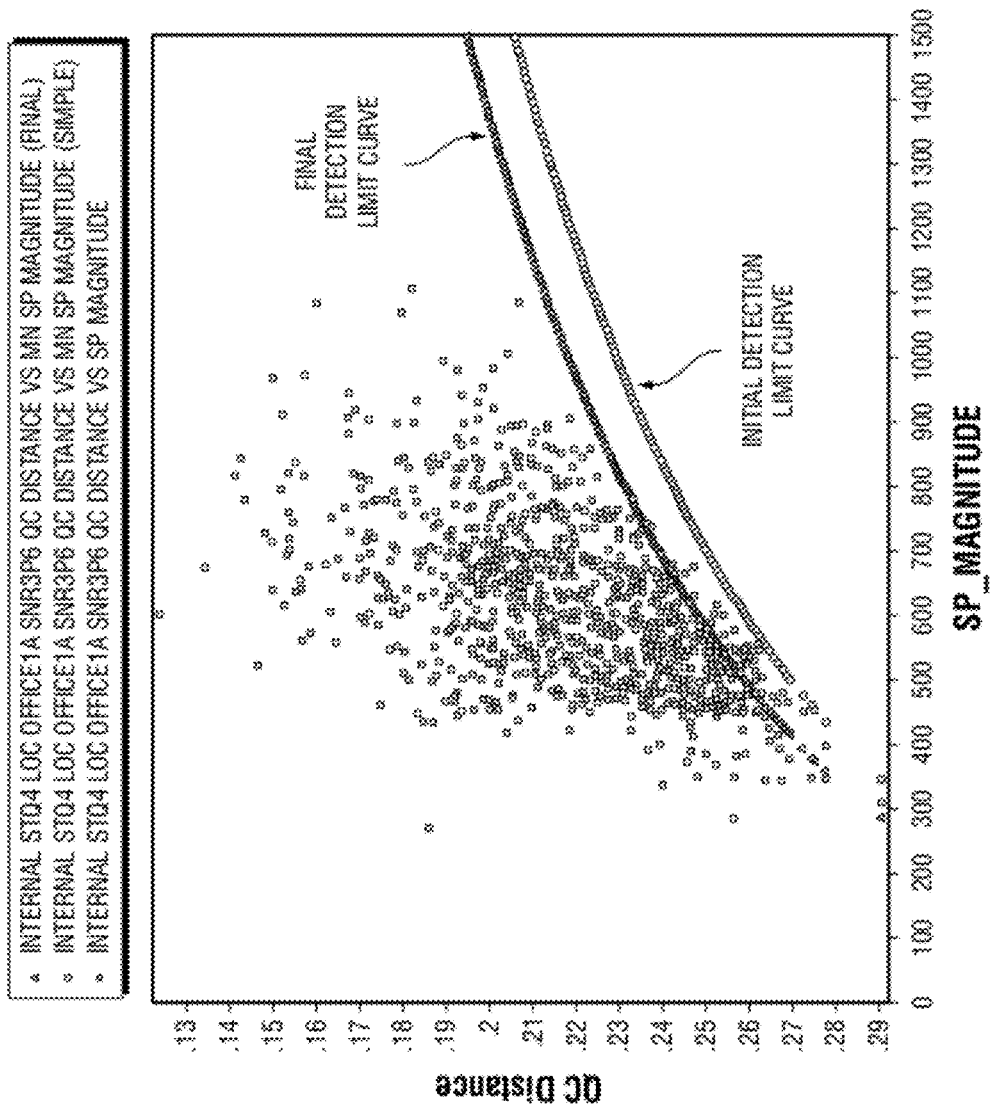
FIG. 12 is a detection limit curve, based on the lowest value of A (labeled 'Initial detection limit') and based on the value of A corresponding to a fit to Gutenberg-Richter (labeled 'Final detection limit').

FIG. 12 shows the detection limit determined using the proposed method for some field data from the Barnett Shale. FIG. 12 is a detection limit curve, based on the lowest value of A (labeled 'Initial detection limit') and based on the value of A corresponding to a fit to Gutenberg-Richter (labeled 'Final detection limit').

Figure 13:
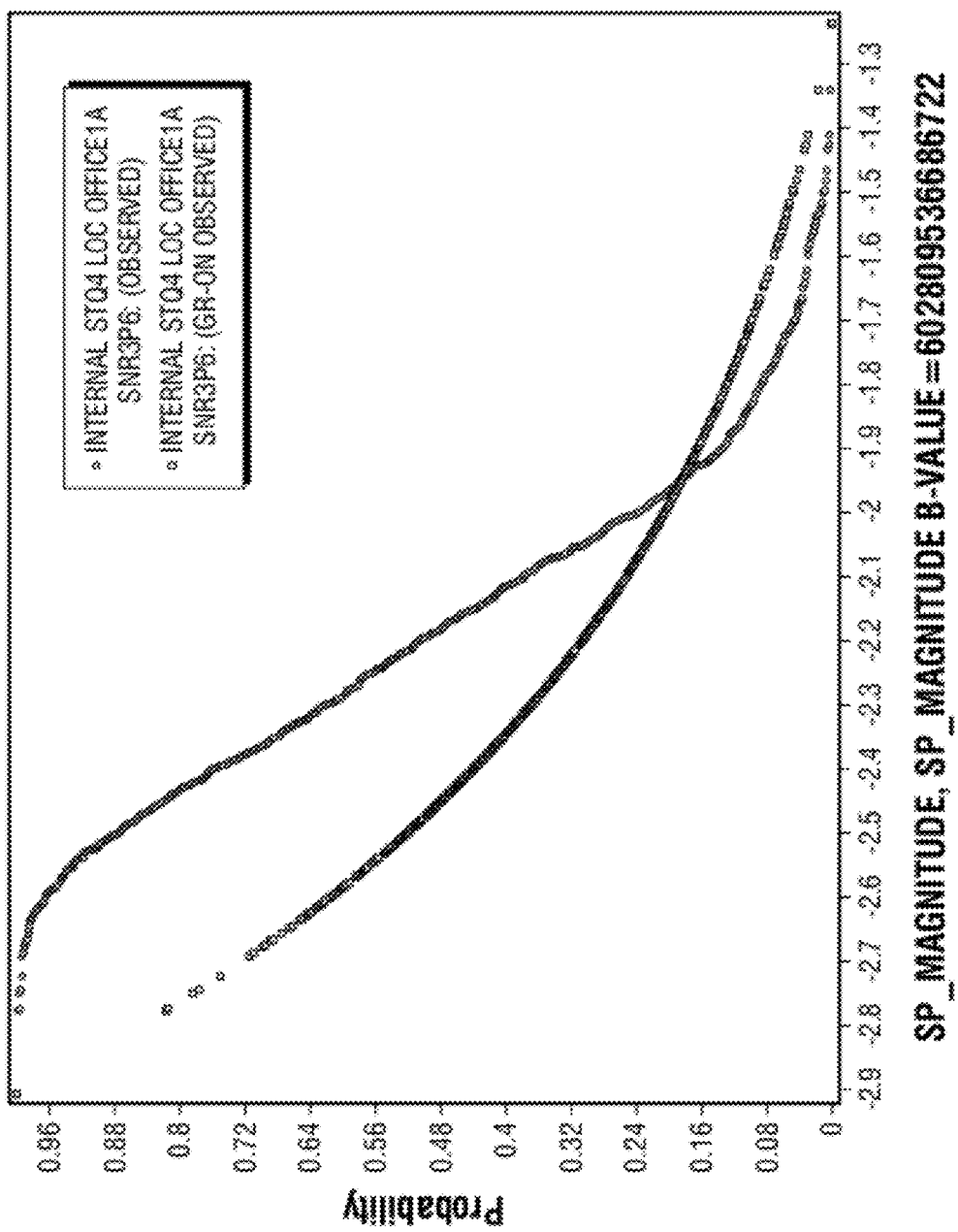
FIG. 13 shows observed data (top curve) and Gutenberg-Richter (lower curve) for the b-value determined across all data (b=0.6).

FIG. 13 shows the field data plotted as a cumulative distribution without accounting for detection limits. The b-value is calculated for the entire data-set using the Aki equation. The resulting Gutenberg-Richter equation is plotted with the data, the data do not appear to conform to Gutenberg-Richter distributed magnitudes. The b-value estimate is 0.6.

Figure 14:
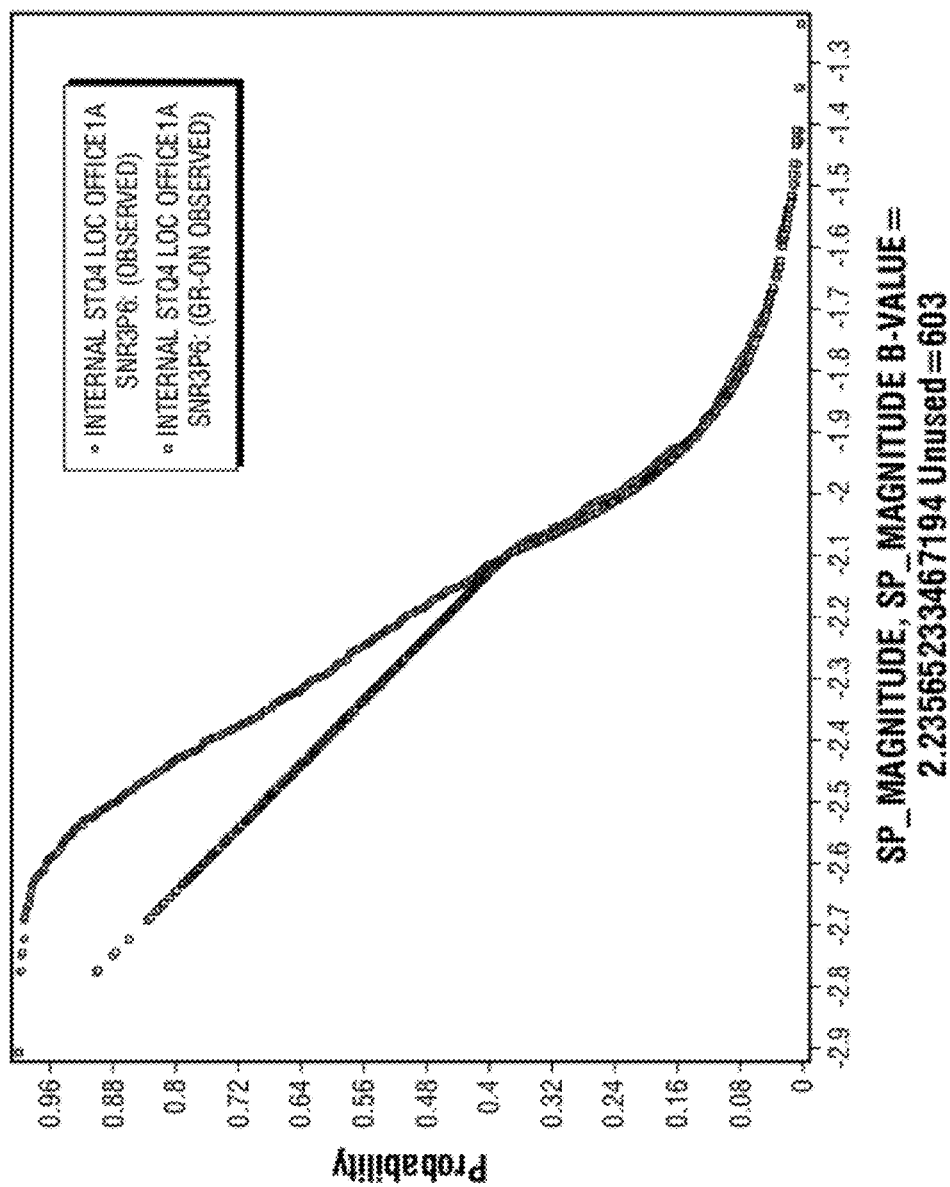
FIG. 14 shows the same observed data as FIG. 13 with Gutenberg-Richter fitted to 5 percent significance by increasing the minimum magnitude used to calculate b-value (b=2.2) through the removal of events.

FIG. 14 shows the same data with b-value estimated using the Aki equation by increasing the minimum magnitude (discarding low magnitude events) considered in estimating the b-value until the theoretical curve corresponds to the observed curve at 5% significance, using the Kolmogorov-Smirnov test. The b-value estimate is 2.2. 603 of the 871 events had to be ignored in making this estimate. A straight line is drawn from the end of the Gutenberg-Richter fitted portion of the data to complete the cumulative distribution. Such a straight line corresponds to random distribution of magnitudes on the frequency-magnitude plot, from this analysis (which does not include the modified Lynden-Bell reconstruction) it would not be obvious whether there was noise in the observed data. The straight line from the end of the fitted data to the end of the cumulative distribution would correspond to a random magnitude distribution.

Figure 15:
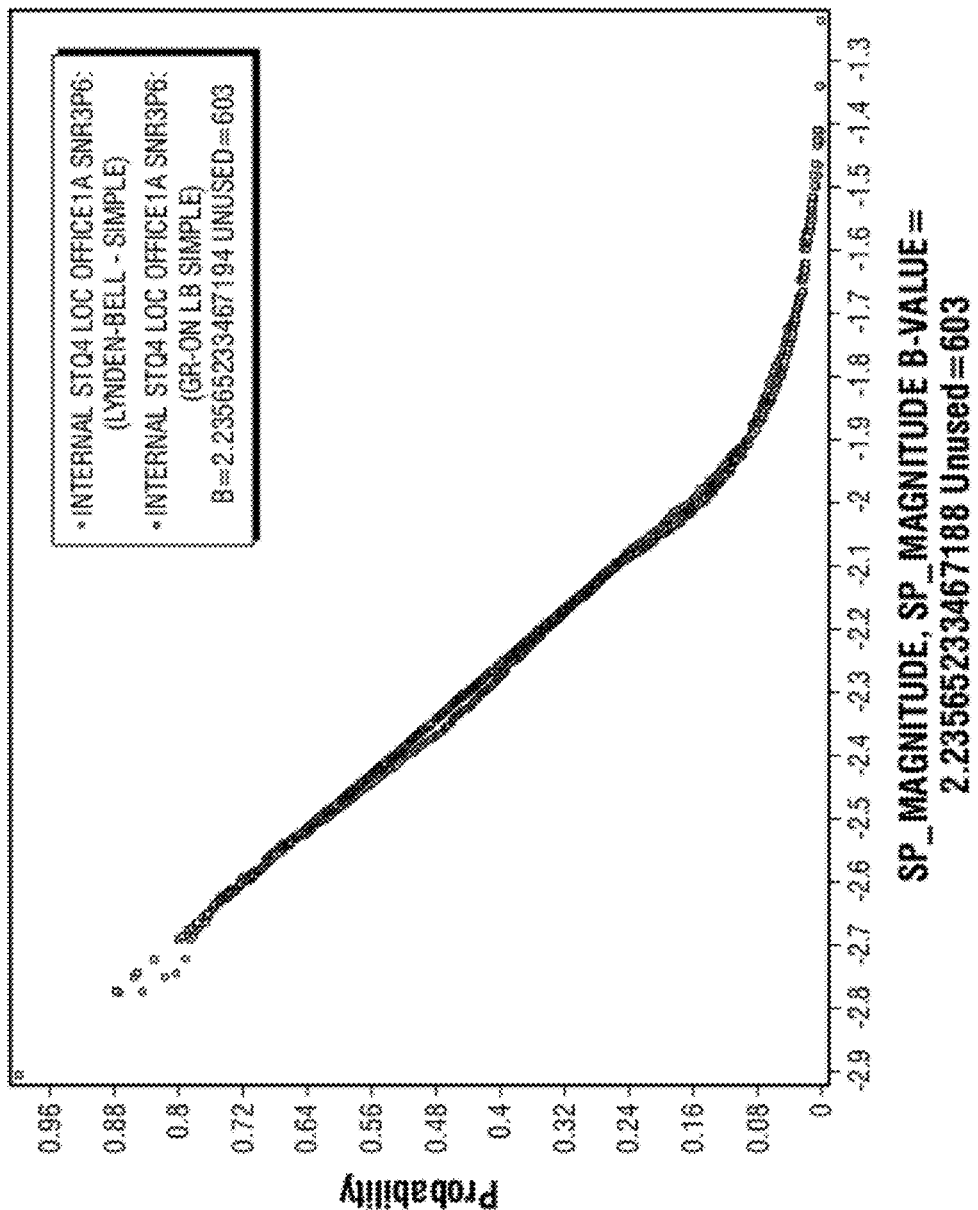
FIG. 15 shows the same data as FIG. 14, this time corresponding to the Lynden-Bell reconstruction of the complete data-set.
Figure 16:
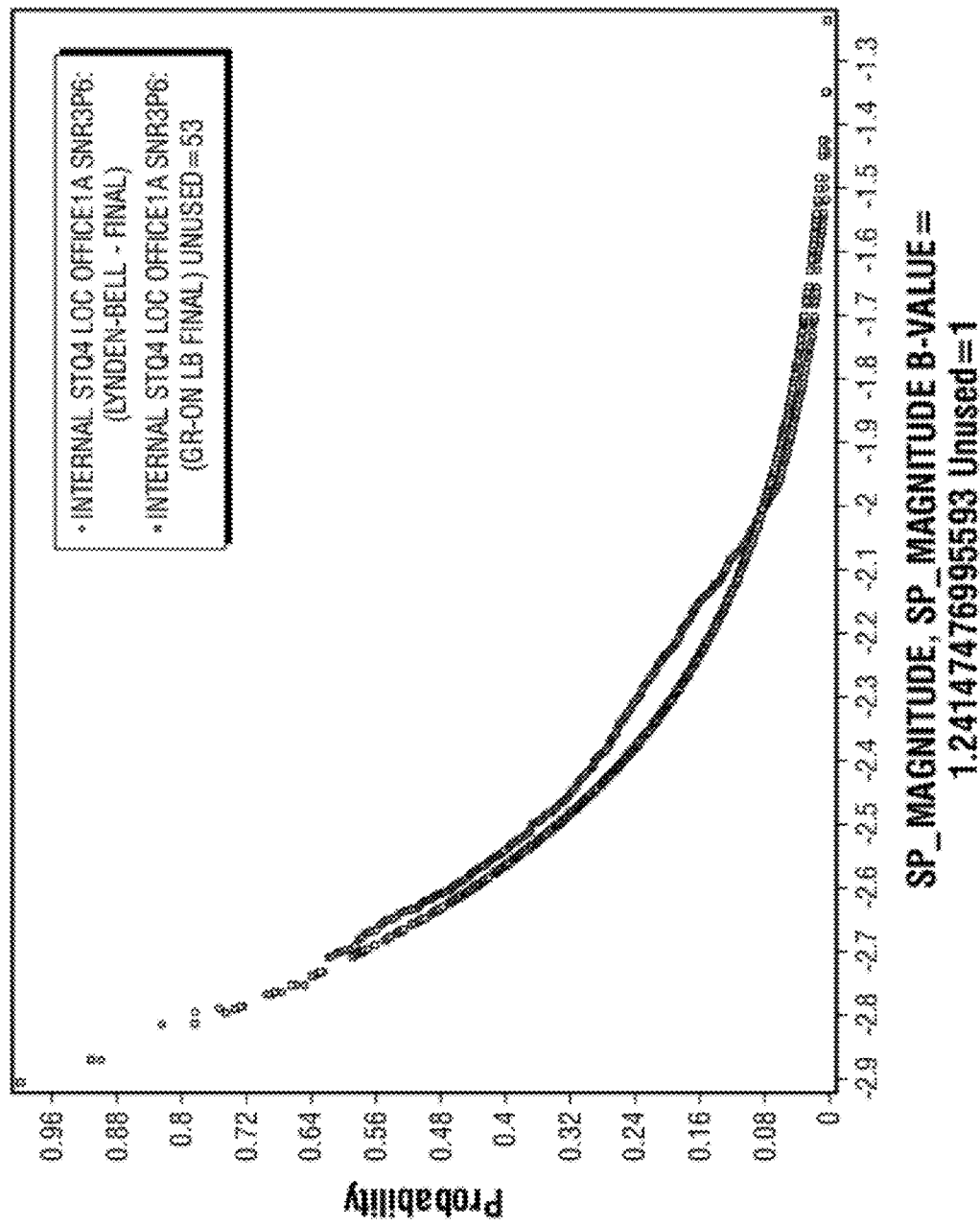
FIG. 16 shows the same data as FIG. 14, fully analyzed by application of the algorithm, here only 53 of the 871 events are discarded, so one is using much more of the data.

FIG. 15 shows the same data as FIG. 14, this time corresponding to the Lynden-Bell reconstruction of the complete data-set. The b-value is estimated as above, by increasing the minimum magnitude by discarding events, to obtain a fit at 5% significance. The answer is the same as in the first case, (b=2.2, 603 events discarded). However, note that the straight-line above the fitted data lies very close to the recovered distribution, indicating that the data are contaminated by a random distribution of magnitudes. FIG. 16 shows the same field data, fully analyzed by application of the algorithm, here only 53 of the 871 events are discarded, so one is using much more of the data. By incrementing the detection limit curve (A) one obtains the final detection limit curve in FIG. 12. The b-value determined here is b=1.2. Note that the straight line part in the theoretical curve (indicating random magnitudes below the limit where the Gutenberg-Richter fit is achieved) lies almost exactly along the observed data. Right plot show the result of the iterative removal of events using the method outlined.

Figure 17:
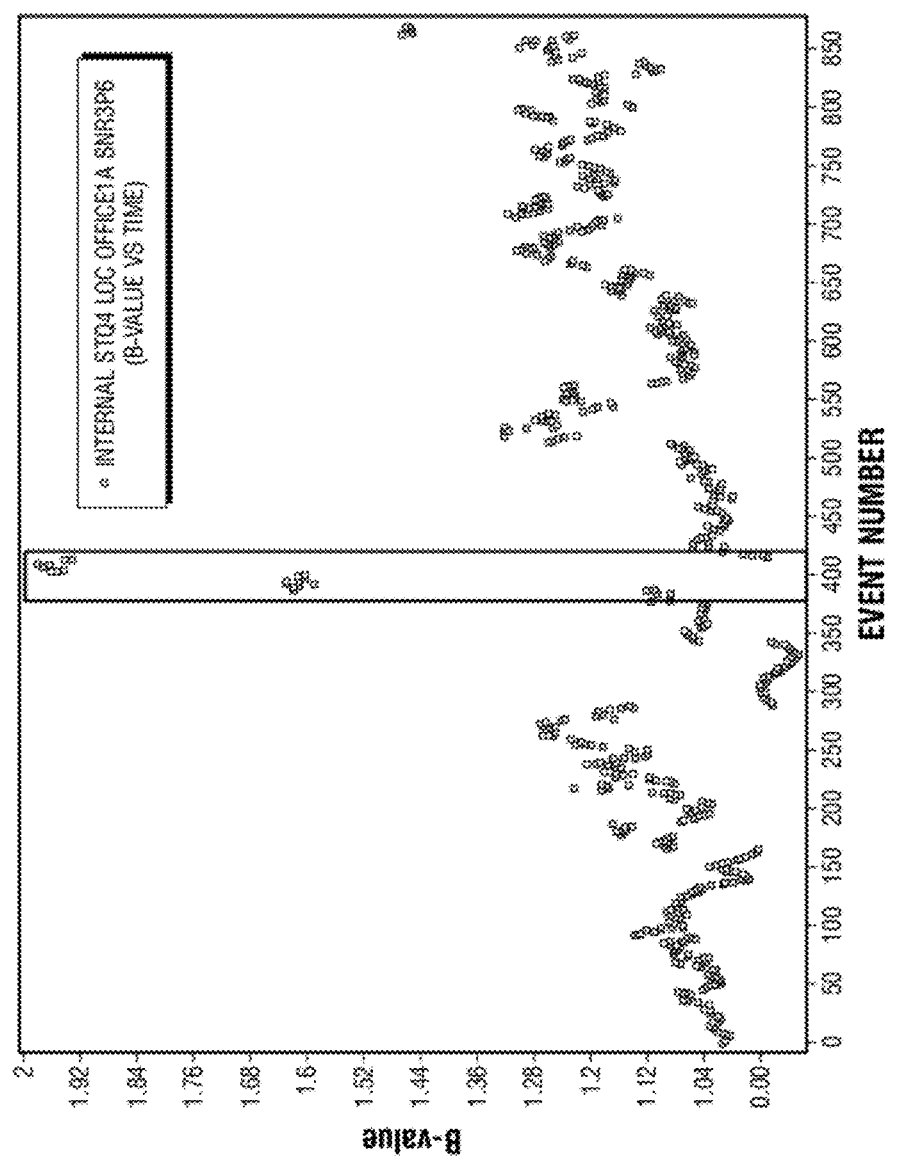
FIG. 17 shows the same data as FIG. 14, with b-values versus event number, calculated by using a running window of 100 events and applying the algorithm.

FIG. 17 shows the same data, with b-values versus event number, calculated by using a running window of 100 events and applying the algorithm. The EVENT NUMBER corresponds to the first event in the window. The highlighted region shows a period of anomalously high b-value. Thus, part of the event set is clearly distinguished by high b-values.

Figure 18:
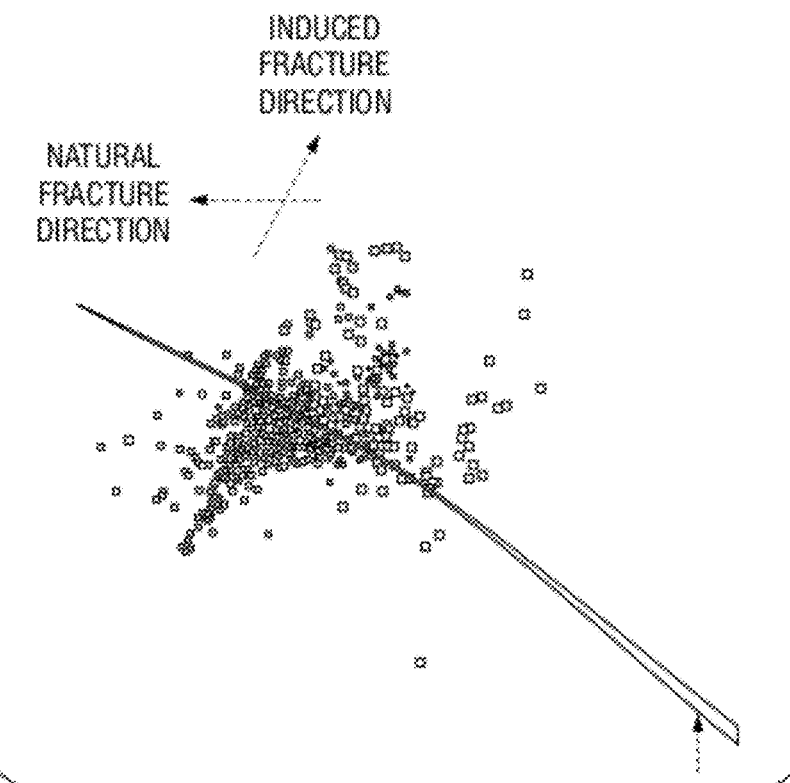
FIG. 18 shows microseismic events excluding those from the highlighted region in FIG. 17.
Figure 19:
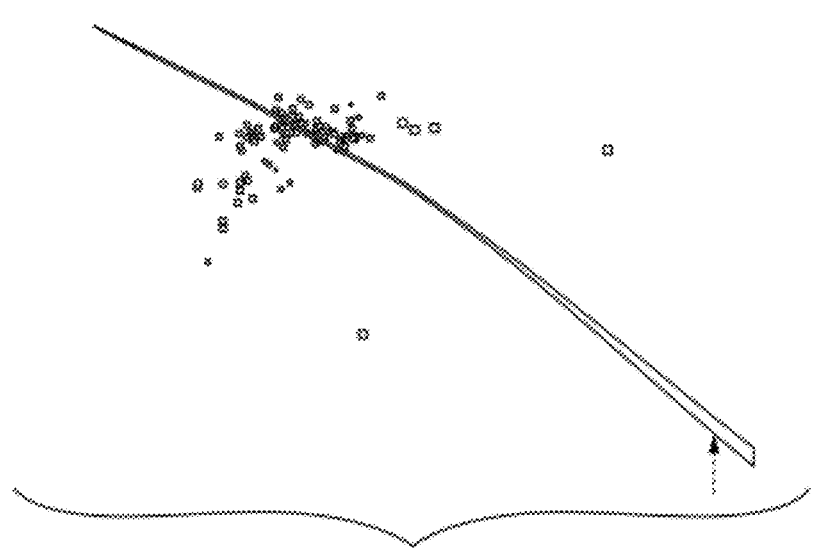
FIG. 19 shows the events from the highlighted region in FIG. 17.

FIGS. 18 and 19 show the data corresponding to high b-values (FIG. 18) compared to all the rest of the events (FIG. 19). That is, FIG. 18 shows microseismic events excluding those from the highlighted region in FIG. 17. FIG. 19 shows the events from the highlighted region in FIG. 17.

Figure 24:
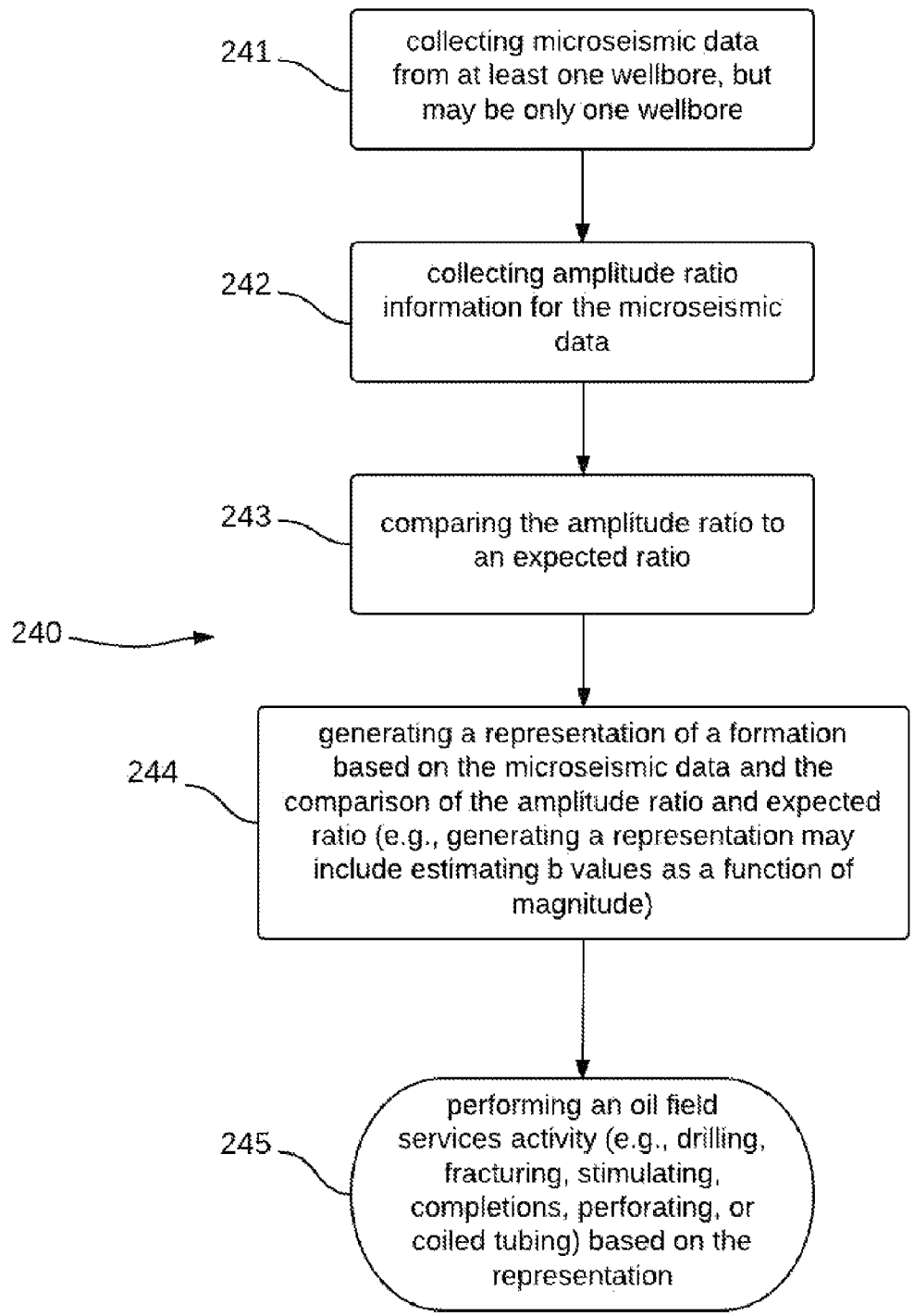
FIG. 24 is a flow chart illustrating a method of processing a subterranean formation in accordance with an embodiment of the present disclosure.

FIG. 24 depicts a flow chart of a method (240) for processing a subterranean formation in accordance with at least one embodiment of the present disclosure. The method includes the steps of: collecting (241) microseismic data from one wellbore; collecting (242) amplitude ratio information for the microseismic data; comparing (243) the amplitude ratio to an expected ratio; generating (244) a representation of a formation based on the microseismic data and the comparison of the amplitude ratio and expected ratio; and performing (245) an oil field services activity based on the representation. In at least one aspect of the present embodiment, collecting (241) microseismic data from one wellbore may not comprise collecting data from two wellbores. In addition, performing (245) an oil field services activity may include drilling, fracturing, stimulating, completions, perforating, or coiled tubing activities. Moreover, generating (244) a representation may include estimating b values as a function of magnitude.

Figure 25:
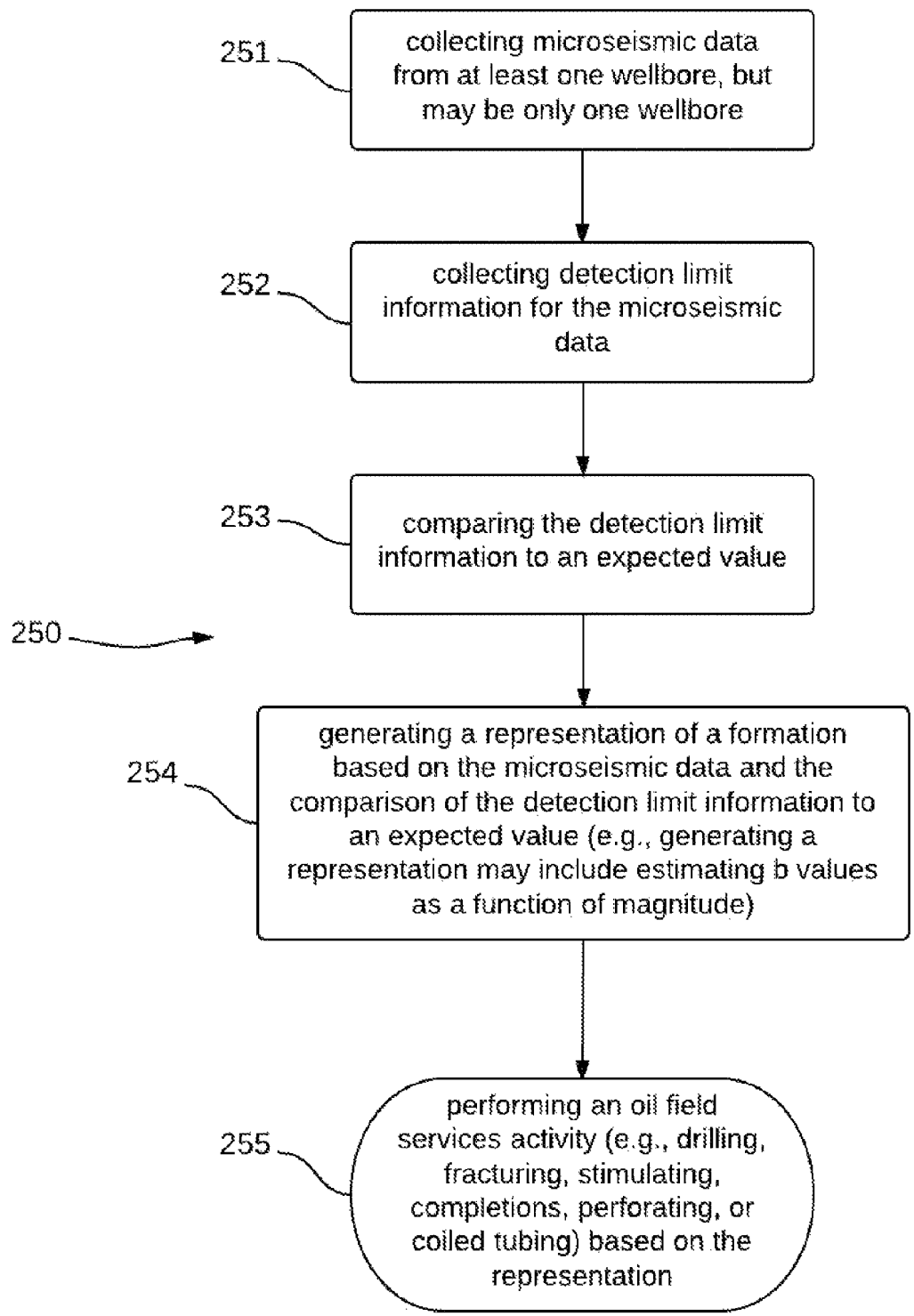
FIG. 25 is a flow chart illustrating a method of processing a subterranean formation in accordance with another embodiment of the present disclosure.

FIG. 25 depicts a flow chart of a method (250) for processing a subterranean formation in accordance with at least one other embodiment of the present disclosure. The method includes the steps of: collecting (251) microseismic data; collecting (252) detection limit information for the microseismic data; comparing (253) the detection limit information to an expected value; generating (254) a representation of a formation based on the microseismic data and the comparison of the detection limit information to an expected value; and performing (255) an oil field services activity based on the representation. In at least one aspect of the present embodiment, collecting (251) microseismic data from one wellbore may not comprise collecting data from two wellbores. In addition, performing (255) an oil field services activity may include drilling, fracturing, stimulating, completions, perforating, or coiled tubing activities. Moreover, generating (254) a representation may include estimating b values as a function of magnitude.

The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method of processing a subterranean formation, comprising:
   collecting microseismic data from one wellbore;
   collecting amplitude ratio information for the microseismic data;
   comparing the amplitude ratio to an expected ratio;
   generating a representation of a formation based on the microseismic data and the comparison of the amplitude ratio and expected ratio; and
   performing an oil field services activity based on the representation.

2. The method of claim 1, wherein the comparing comprises application of the Bayes theorem.

3. The method of claim 1, wherein the comparing comprises application of the Lynden-Bell algorithm.

4. The method of claim 1, wherein the comparing comprises calculating a b-value.

5. The method of claim 1, wherein the comparing comprises a Kolmogorov-Smirnov test.

6. The method of claim 1, wherein the calculating comprises calculating a detection limit.

7. The method of claim 1, wherein the collecting the microseismic data from one wellbore does not comprise collecting data from two wellbores.

8. The method of claim 1, wherein the generating a representation comprises comparing theoretical curves to possible orientations.

9. The method of claim 1, wherein the performing an oil field services activity comprises drilling, fracturing, stimulating, completions, perforating, or coil tubing activities.

10. The method of claim 1, wherein the generating a representation comprises estimating b values as a function of magnitude.

11. A method of processing a subterranean formation, comprising:
    collecting microseismic data;
    collecting detection limit information for the microseismic data;
    comparing the detection limit information to an expected value;
    generating a representation of a formation based on the microseismic data and the comparison of the detection limit information to an expected value; and
    performing an oil field services activity based on the representation.

12. The method of claim 11, wherein the comparing comprises application of the Bayes theorem.

13. The method of claim 11, wherein the comparing comprises application of the Lynden-Bell algorithm.

14. The method of claim 11, wherein the comparing comprises calculating a b-value.

15. The method of claim 11, wherein the comparing comprises a Kolmogorov-Smirnov test.

16. The method of claim 11, wherein the calculating comprises calculating a detection limit.

17. The method of claim 11, wherein the collecting the microseismic data from one wellbore does not comprise collecting data from two wellbores.

18. The method of claim 11, wherein the generating a representation comprises comparing theoretical curves to possible orientations.

19. The method of claim 11, wherein the performing an oil field services activity comprises drilling, fracturing, stimulating, completions, perforating, or coil tubing activities.

20. The method of claim 11, wherein the generating a representation comprises estimating b values as a function of magnitude.

* * * * *